(12) United States Patent
Hatano et al.

(10) Patent No.: US 8,203,686 B2
(45) Date of Patent: Jun. 19, 2012

(54) LIQUID CRYSTAL DISPLAY DEVICE COMPRISING A MICROSTRUCTURE AND METHOD FOR MANUFACTURING THE SAME

(75) Inventors: Kaoru Hatano, Kanagawa (JP); Takeshi Nishi, Fukuoka (JP); Shuji Fukai, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 601 days.

(21) Appl. No.: 12/364,688

(22) Filed: Feb. 3, 2009

(65) Prior Publication Data
US 2009/0201450 A1  Aug. 13, 2009

(30) Foreign Application Priority Data

Feb. 6, 2008  (JP) ................................ 2008-026560

(51) Int. Cl.
G02F 1/1339 (2006.01)
G02F 1/1333 (2006.01)

(52) U.S. Cl. .......... 349/155; 349/160; 200/600; 438/23; 345/173

(58) Field of Classification Search .......... 349/155–160; 200/600; 438/23; 345/173
See application file for complete search history.

(56) References Cited

U.S. PATENT DOCUMENTS

| | | | |
|---|---|---|---|
| 5,268,782 A * | 12/1993 | Wenz et al. ................... | 349/156 |
| 6,037,719 A | 3/2000 | Yap et al. | |
| 6,392,618 B1 | 5/2002 | Kimura | |
| 6,421,160 B2 | 7/2002 | Ham | |
| 6,583,915 B1 | 6/2003 | Hong et al. | |
| 6,972,777 B2 | 12/2005 | Shigeta | |
| 7,251,410 B2 | 7/2007 | Ide | |
| 7,560,789 B2 * | 7/2009 | Izumi et al. ................... | 257/419 |
| 2001/0028430 A1 | 10/2001 | Koma | |
| 2003/0227361 A1 | 12/2003 | Dickens et al. | |
| 2004/0031670 A1 | 2/2004 | Wong | |
| 2004/0140872 A1 | 7/2004 | Wong | |
| 2007/0093045 A1 | 4/2007 | Yamaguchi et al. | |
| 2007/0218630 A1 | 9/2007 | Yamaguchi et al. | |
| 2008/0176046 A1 | 7/2008 | Yamaguchi et al. | |
| 2008/0237005 A1 | 10/2008 | Honda | |
| 2010/0300862 A1 * | 12/2010 | Tamura et al. ................ | 200/600 |

FOREIGN PATENT DOCUMENTS

| | | |
|---|---|---|
| JP | 60-247622 | 12/1985 |
| JP | 09-092909 | 4/1997 |
| JP | 11-174994 | 7/1999 |
| JP | 2000-208018 | 7/2000 |

(Continued)

*Primary Examiner* — Huyen Ngo
(74) *Attorney, Agent, or Firm* — Nixon Peabody LLP; Jeffrey L. Costellia

(57) ABSTRACT

To improve the response speed of liquid crystal molecules when a liquid crystal display device is changed from an on state to an off state. A liquid crystal display device that includes a liquid crystal material between a substrate and a counter substrate; a plurality of pixels over the substrate; and a microstructure which is provided over the substrate, is in contact with the liquid crystal material, and includes a movable portion and a method for manufacturing the liquid crystal display device are provided. The microstructure may include a lower electrode, an upper electrode, and a space between the lower electrode and the upper electrode. The microstructure is manufactured through the steps of forming the lower electrode over the substrate, forming a sacrificial layer over the lower electrode, forming the upper electrode over the sacrificial layer, and removing the sacrificial layer by etching to form the space.

18 Claims, 24 Drawing Sheets

FOREIGN PATENT DOCUMENTS

| | | |
|---|---|---|
| JP | 2001-033827 | 2/2001 |
| JP | 2003-203549 | 7/2003 |
| JP | 2003-217423 | 7/2003 |
| JP | 2004-295141 | 10/2004 |
| JP | 3590283 | 11/2004 |
| JP | 2005-528751 | 9/2005 |
| JP | 3865942 | 1/2007 |

* cited by examiner

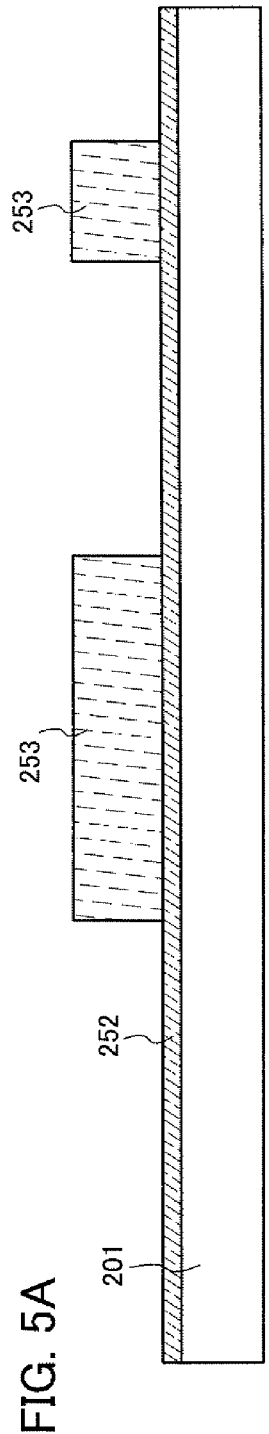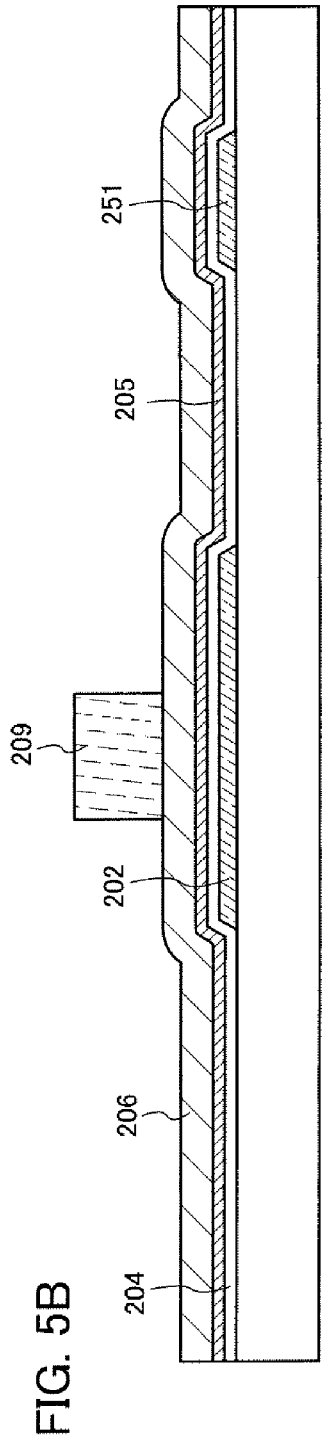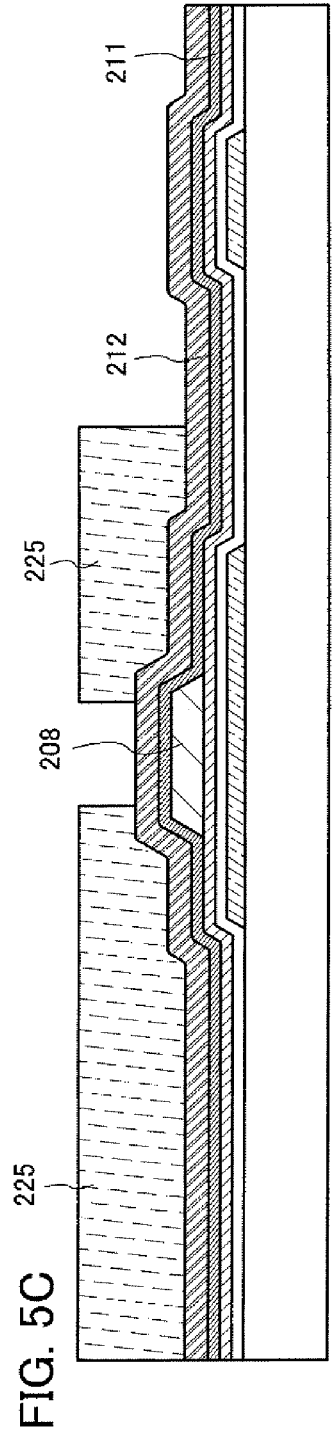

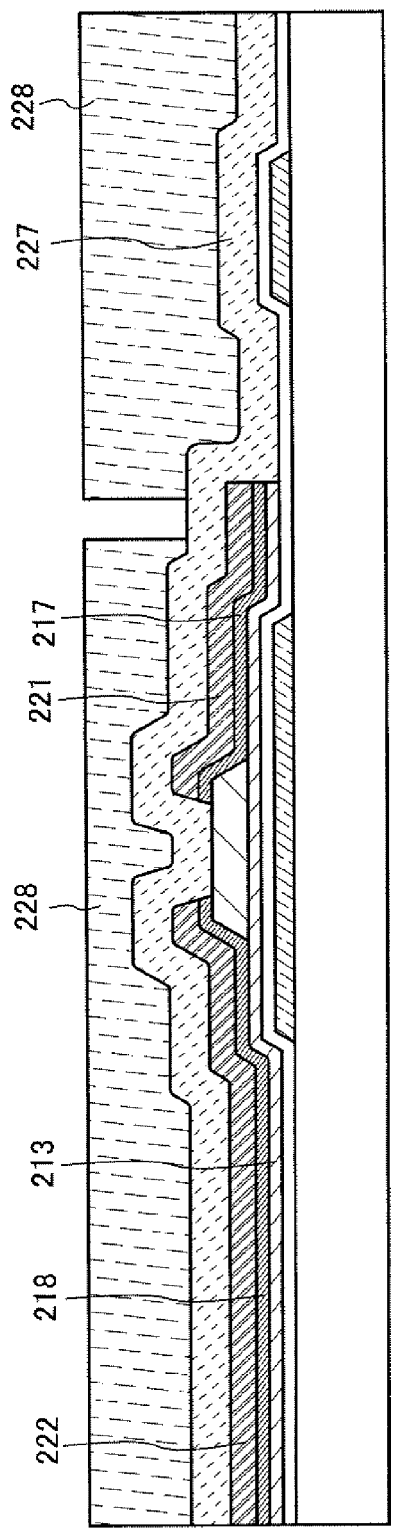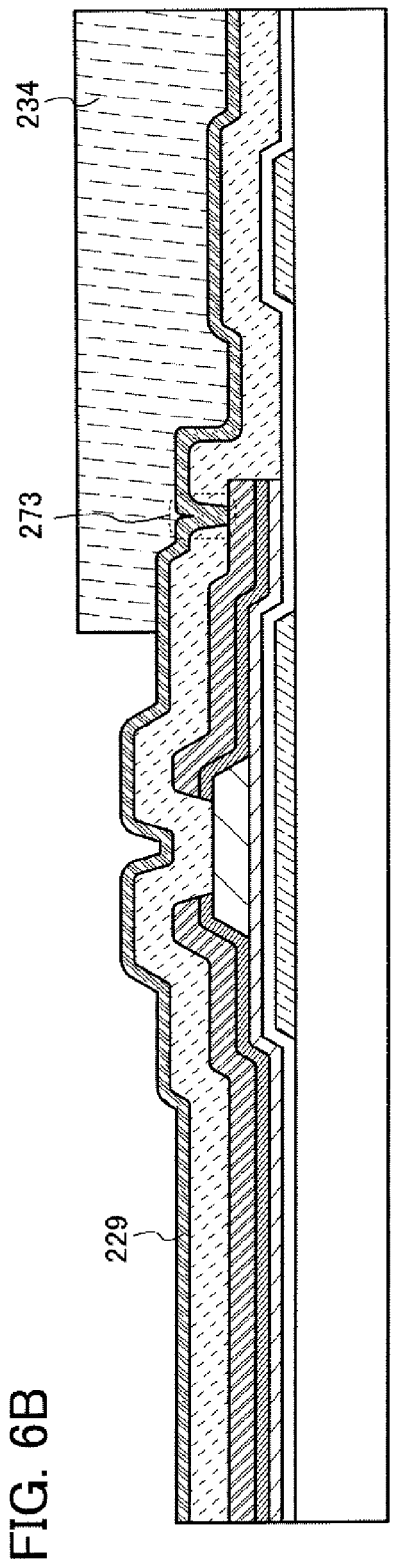

331  333

334

341

342

D----------------------------------------D'

411    401

268

261

LIQUID CRYSTAL DISPLAY DEVICE COMPRISING A MICROSTRUCTURE AND METHOD FOR MANUFACTURING THE SAME

BACKGROUND OF THE INVENTION

1. Field of the Invention

The invention disclosed in this specification relates to a liquid crystal display device including a microstructure and a method for manufacturing the liquid crystal display device.

2. Description of the Related Art

A variety of technologies have been developed in order to improve the response speed of liquid crystal elements in liquid crystal display devices.

For example, there is a technology for improving the rising speed of liquid crystal molecules when a liquid crystal element is changed from an off state to an on state in a liquid crystal display device (see Patent Document 1: Japanese Published Patent Application No. 2004-295141).

In addition, a technology in which an oscillator for oscillating liquid crystal is provided outside a liquid crystal display device to control alignment of the liquid crystal by applying oscillation from outside a liquid crystal panel has also been developed (see Patent Document 2: Japanese Published Patent Application No. 2001-33827 and Patent Document 3: Japanese Published Patent Application No. S60-247622).

SUMMARY OF THE INVENTION

In a liquid crystal display device, the state where a liquid crystal element is changed from an off state to an on state is the state where liquid crystal molecules are naturally relaxed without application of voltage. Accordingly, the response speed of the liquid crystal molecules from an on state to an off state only depends on characteristics of a liquid crystal material, and it is difficult to improve the response speed.

It is possible to improve the rising speed of liquid crystal molecules when a liquid crystal element is changed from an off state to an on state. However, it is difficult to improve the rising speed of liquid crystal molecules when a liquid crystal element is changed from an on state to an off state.

In addition, even when alignment of liquid crystal molecules is to be controlled by oscillation from the outside, oscillation from an oscillator might not be sufficiently transmitted because the loss of oscillation energy occurs due to a substrate, an alignment film, a color filter, a pixel electrode, or the like.

In view of the foregoing problems, the invention disclosed in this specification provides a technology for improving the speed of liquid crystal element molecules when a liquid crystal display device is changed from an on state to an off state.

A micro electro mechanical system (MUMS) including a movable portion is provided in a liquid crystal element of a liquid crystal display device. By operating the movable portion of the micro electro mechanical system, liquid crystal molecules in the liquid crystal element are excited, so that the time it takes for the liquid crystal molecules to be aligned from an on state to an off state is reduced. Note that in this specification, such a micro electro mechanical system including a movable portion is also referred to as a movable element.

A MEMS is also called a micromachine or a micro system technology (MST) and refers to a minute mechanical structure (called a microstructure in this specification). A microstructure has a three-dimensional structure which is partially movable, unlike a semiconductor element such as a transistor.

A microstructure includes a structural layer having a beam structure in which an edge portion thereof is fixed to a substrate, and has a space between the substrate and the structural layer. Since there is such a space, a microstructure in which the structural layer is partially movable can realize a variety of functions.

In the invention disclosed in this specification, a microstructure as described above is provided so as to be in direct contact with liquid crystal molecules in a pixel of a liquid crystal display device, and a movable portion of the microstructure is operated. Accordingly, the liquid crystal molecules in a liquid crystal element are directly excited, whereby the response speed of the liquid crystal molecules from an on state to an off state is improved.

When the liquid crystal molecules in the liquid crystal element are directly excited by the microstructure which is a movable element, oscillation by the movable element can be efficiently transmitted to the liquid crystal molecules. Accordingly, energy for driving the movable element can be suppressed.

One aspect of the invention disclosed in this specification is a liquid crystal display device including a liquid crystal material between a substrate and a counter substrate; a plurality of pixels over the substrate; and a microstructure which is provided over the substrate, is in contact with the liquid crystal material, and includes a movable portion.

The microstructure may include a lower electrode, an upper electrode, and a space between the lower electrode and the upper electrode.

A structural layer formed of an insulating film may be provided over the upper electrode.

The microstructure may be provided in each of the plurality of pixels.

A thin film transistor may be provided in each of the plurality of pixels.

Another aspect of the invention disclosed in this specification is a method for manufacturing a liquid crystal display device, including the steps of forming a plurality of pixels over a substrate, forming a microstructure including a lower electrode, an upper electrode, and a space between the lower electrode and the upper electrode over the substrate, providing a counter substrate so as to face the substrate, and dropping a liquid crystal material between the substrate and the counter substrate.

The microstructure may be manufactured through the steps of forming the lower electrode over the substrate, forming a sacrificial layer over the lower electrode, forming the upper electrode over the sacrificial layer, and removing the sacrificial layer by etching to form the space.

A structural layer formed of an insulating film may be formed over the upper electrode.

The microstructure may be formed in each of the plurality of pixels.

A thin film transistor may be formed in each of the plurality of pixels.

According to the invention disclosed in this specification, the response speed of liquid crystal molecules at the time when a liquid crystal display device is changed from an on state to an off state can be improved. Accordingly, the driving speed of the entire liquid crystal display device can be improved.

Further, a microstructure is provided so as to be in direct contact with a liquid crystal material in a liquid crystal panel, so that the liquid crystal material can be directly excited by the microstructure.

When liquid crystal molecules in a liquid crystal element are directly excited by a microstructure which is a movable element, oscillation by the movable element can be efficiently transmitted to the liquid crystal molecules. Accordingly, energy for driving the movable element can be suppressed, and a power-saving liquid crystal display device can be realized.

In addition, one microstructure can be provided not only for a liquid crystal panel but also for a plurality of pixels or each pixel. In such a liquid crystal panel the response speed of liquid crystal molecules can be improved in each pixel, so that an image with improved quality can be displayed.

BRIEF DESCRIPTION OF THE DRAWINGS

FIGS. 5A to 5C are cross-sectional views illustrating steps for manufacturing a liquid crystal display device;

FIGS. 6A and 6B are cross-sectional views illustrating steps for manufacturing a liquid crystal display device;

DETAILED DESCRIPTION OF THE INVENTION

Figure 1:
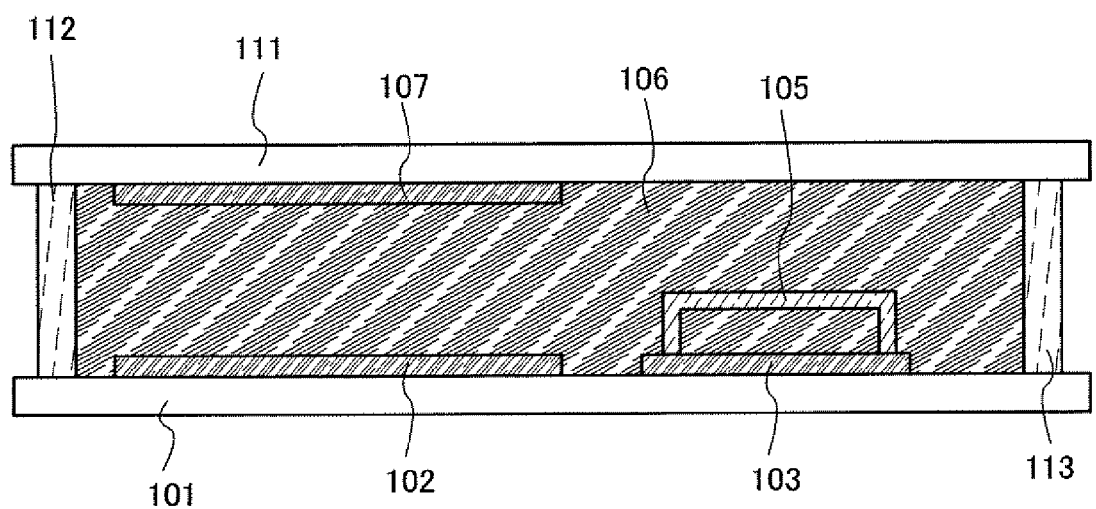
FIG. 1 is a cross-sectional view of a liquid crystal display device including a microstructure.

Embodiment modes of the invention disclosed in this specification will be hereinafter described with reference to the accompanying drawings. Note that the invention disclosed in this specification can be implemented in various modes, and it is easily understood by those skilled in the art that modes and details can be variously changed without departing from the spirit and the scope of the invention disclosed in this specification. Therefore, the invention disclosed in this specification is not construed as being limited to the description of the embodiment modes. Note that in the drawings shown below, the same portions or portions having similar functions are denoted by the same reference numerals, and the description thereof will not be repeated.

[Embodiment Mode 1]

This embodiment mode is described with reference to FIG. 1, FIGS. 2A to 2F, FIGS. 3A and 3B, FIG. 4, FIGS. 5A to 5C, FIGS. 6A and 6B, FIG. 7, FIG. 8, FIGS. 9A to 9D, FIGS. 10A and 10B, FIG. 21, FIG. 22, FIGS. 23A to 23D, and FIGS. 24A to 24D.

FIG. 1 is a schematic diagram of a liquid crystal display device including a microstructure. An electrode 102, an electrode 103, and a microstructure 105 including a movable portion are formed over a substrate 101. Moreover, a counter electrode 107 is formed on a counter substrate 111 which faces the substrate 101. The substrate 101 and the counter substrate 111 are sealed by sealing materials 112 and 113. A liquid crystal material 106 fills a space between the substrate 101 and the counter substrate 111. The microstructure 105 is in direct contact with the liquid crystal material 106 and makes the liquid crystal material 106 excited as a movable element, whereby the response speed of the liquid crystal material 106 can be improved.

As the liquid crystal material, a nematic liquid crystal material, a smectic liquid crystal material, a cholesteric liquid crystal material, a liquid crystal material which is to be homogeneously aligned, a liquid crystal which is to be homeotropically aligned, or the like can be used.

A method for manufacturing a microstructure is described with reference to FIGS. 2A to 2F and FIGS. 3A and 3B.

Figure 2A:
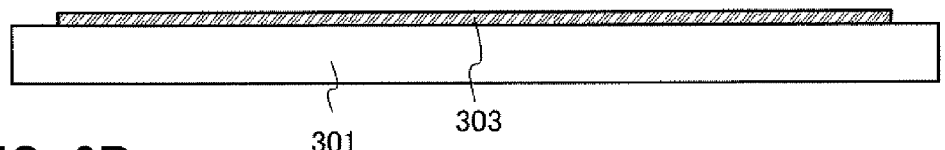
FIGS. 2A to 2F are cross-sectional views illustrating steps for manufacturing a microstructure.

First, as illustrated in FIG. 2A, a lower electrode 303 is formed over an insulating surface 301.

For the lower electrode 303, a light-transmitting conductive film, for example, a film formed of metal oxide or semiconductor oxide such as indium tin oxide (ITO), indium tin oxide containing silicon oxide, indium zinc oxide (IZO), or zinc oxide is used. In this embodiment mode, the lower electrode 303 is formed using indium tin oxide.

Figure 2B:

Next, a sacrificial layer 321 is formed as illustrated in FIG. 2B. The sacrificial layer 321 is formed for securing a space that is formed later in a microstructure.

Figure 2C:
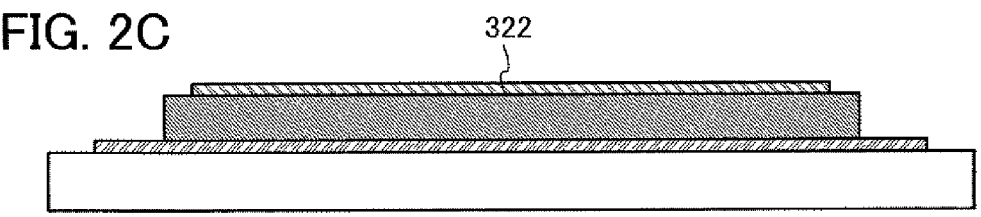

Then, as illustrated in FIG. 2C, an upper electrode 322 is formed over the sacrificial layer 321.

Figure 2D:
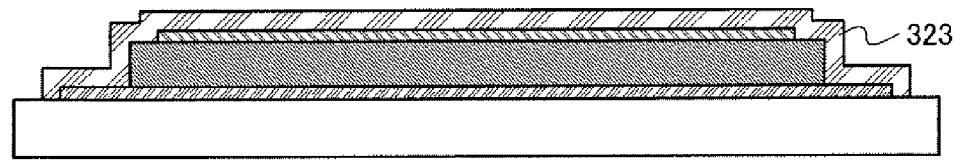
Figure 2E:
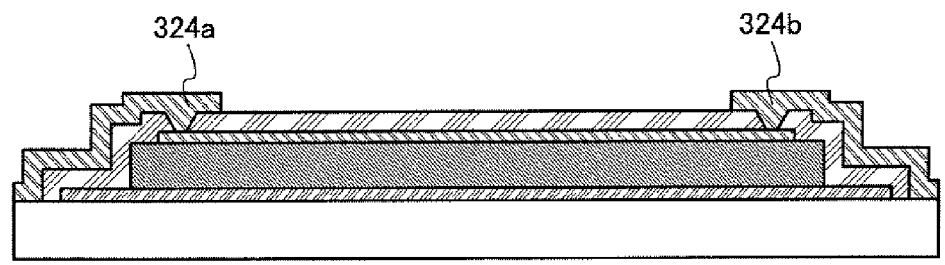

Then, as illustrated in FIG. 2D, a structural layer 323 is formed over the sacrificial layer 321 and the upper electrode 322. The structural layer 323 is formed using an insulating material by a CVD method.

Next, contact holes are formed in the structural layer 323. The contact holes are formed only at a portion where the upper electrode 322 exists thereunder, and thus the sacrificial layer 321 is not exposed. Then, wiring layers 324a and 324b which are electrically connected to the upper electrode 322 through the contact holes are formed (see FIG. 2E). The wiring layers 324a and 324b are formed rather thick using soft metal such as aluminum. By using such soft metal as a material of the wiring layers 324a and 324b, disconnection can be prevented when the wiring layers 324a and 324b are formed over a large step caused by the sacrificial layer 321 and the structural layer 323.

Figure 2F:
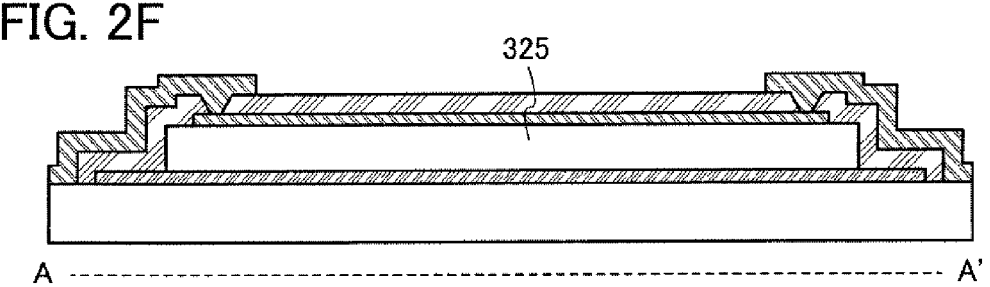

Then, as illustrated in FIG. 2F, the sacrificial layer 321 is removed by etching so that a space 325 is formed. Accordingly, a microstructure in this embodiment mode is completed.

Figure 3A:
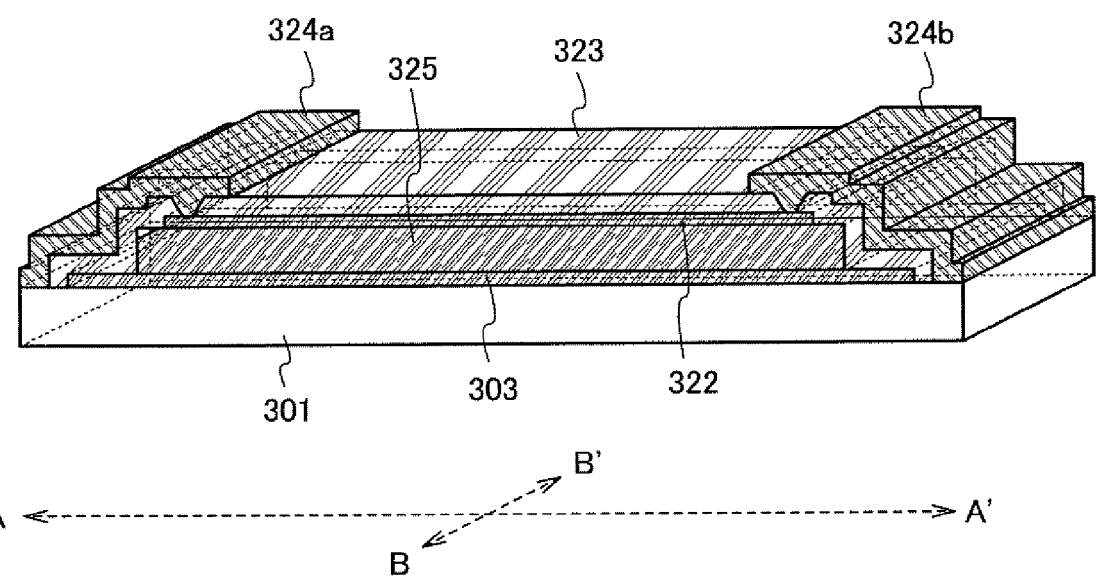
FIG. 3A is a perspective view of a microstructure and FIG. 3B is a cross-sectional view thereof.
Figure 3B:
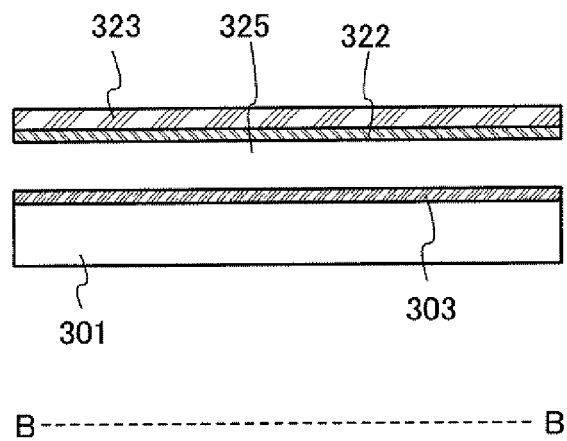

FIG. 3A is a perspective view of the completed microstructure. FIG. 3B is a cross-sectional view along the line B-B' in FIG. 3A. Note that FIG. 2F is a cross-sectional view along the line A-A' in FIG. 3A.

As illustrated in FIGS. 3A and 3B, nothing is formed on a side surface in the B-B' direction. Accordingly, an etchant enters from the side surface, so that the sacrificial layer 321 can be etched.

A material of each layer such as the structural layer 323, the sacrificial layer 321, the wiring layers 324a and 324b, the lower electrode 303, or the upper electrode 322, which is formed by the above manufacturing method, has a property required for each layer and further, is determined in consideration of a relation with other layers.

For example, the structural layer 323 has to be formed using an insulating material. However, not all insulating layers can be used. Since the structural layer 323 is exposed to an etchant in etching the sacrificial layer 321, a condition that the insulating material is not removed by the etchant is required to be considered. Further, the etchant depends on the material of the sacrificial layer 321.

Specifically, when the sacrificial layer 321 is formed of silicon, hydroxide of alkali metal, such as phosphoric acid, potassium hydroxide, sodium hydroxide, or cesium hydroxide; a tetramethylammonium hydroxide (TMAH) solution; or the like can be used as the etchant. A material which is not removed even when any of the above etchants (and which has an insulating property) has to be used for the structural layer 323 and for example, silicon oxide can be used as the material.

Further, when the sacrificial layer 321 is etched, the wiring layers 324a and 324b, the lower electrode 303, and the upper electrode 322 are also exposed to the etchant. Accordingly, the wiring layers 324a and 324b, the lower electrode 303, and the upper electrode 322 are determined in consideration of a condition that they have conductive properties and are not removed by the etchant used when the sacrificial layer 321 is etched.

In this embodiment mode, for example, the structural layer 323 can be formed of silicon oxide; the sacrificial layer 321 can be formed of tungsten (or polyimide); and the wiring layers 324a and 324b and the upper electrode 322 can be formed of metal such as tantalum, aluminum, titanium, gold, or platinum. When the sacrificial layer 321 is formed of tungsten, etching of the sacrificial layer 321 can be wet etching with an ammonia peroxide mixture (a solution in which 28 w % of ammonia and 31 w % of oxygenated water are mixed at a ratio of 1:2) or dry etching with a chlorine trifluoride gas. Alternatively, when the sacrificial layer 321 is formed of polyimide, etching of the sacrificial layer 321 can be wet etching with a commercial polyimide etchant or dry etching with oxygen plasma.

In addition, a method for manufacturing a microstructure which is not provided with a structural layer is described with reference to FIGS. 9A to 9D.

Figure 9A:
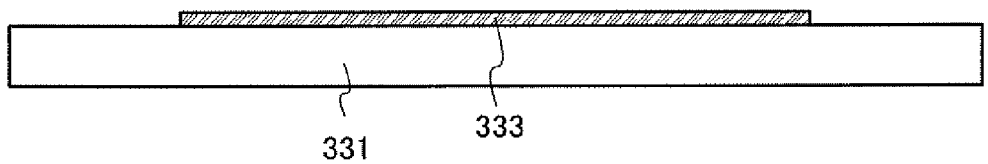
FIGS. 9A to 9D are cross-sectional views illustrating steps for manufacturing a microstructure.

First, a lower electrode 333 is formed over an insulating surface 331 (see FIG. 9A). The lower electrode 333 may be formed of the same material and in the same step as those of the lower electrode 303 and is arranged so as not to be in contact with an upper electrode 341 formed in a later step. This is because short circuit occurs when the lower electrode 333 and the upper electrode 341 are in contact with each other, and thus the entire microstructure does not work.

Figure 9B:
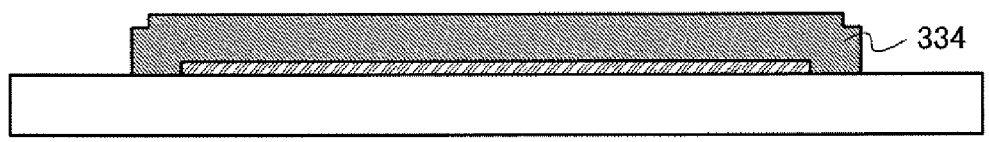

Next, a sacrificial layer 334 is formed over the insulating surface 331 and the lower electrode 333 (see FIG. 9B). The sacrificial layer 334 may be formed of the same material and in the same step as those of the sacrificial layer 321.

Figure 9C:
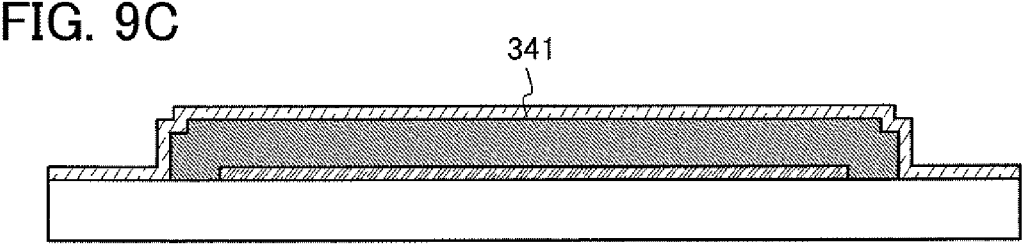

The upper electrode 341 is formed to cover the insulating surface 331 and the lower electrode 333 (see FIG. 9C). The upper electrode 341 may be formed of the same material and in the same step as those of the upper electrode 322 or the wiring layers 324a and 324b illustrated in FIGS. 2C and 2E and FIGS. 3A and 3B.

Figure 9D:
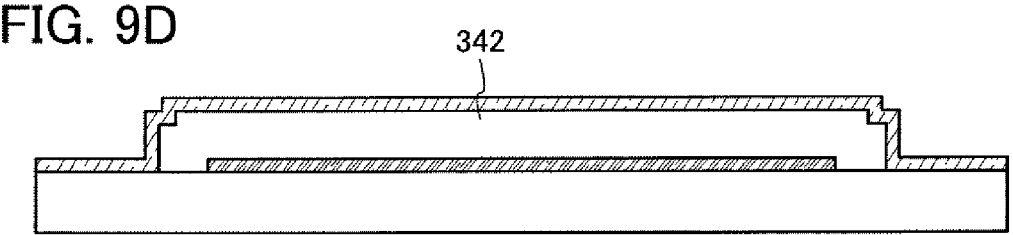

Then, the sacrificial layer 334 is removed by etching to form a space 342 (see FIG. 9D). Accordingly, a microstructure is completed.

Figure 10A:
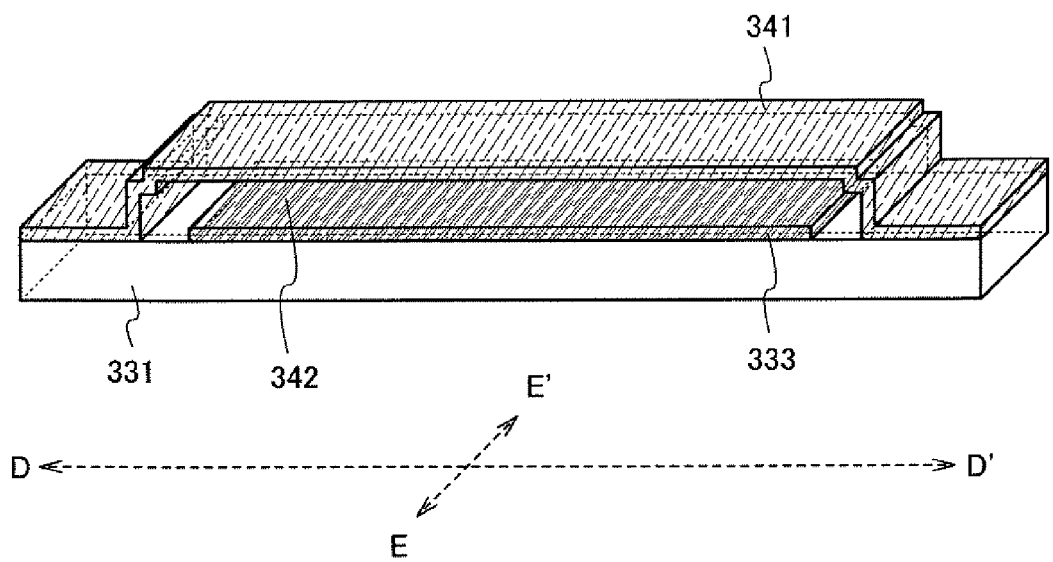
FIG. 10A is a perspective view of a microstructure and FIG. 10B is a cross-sectional view thereof.
Figure 10B:
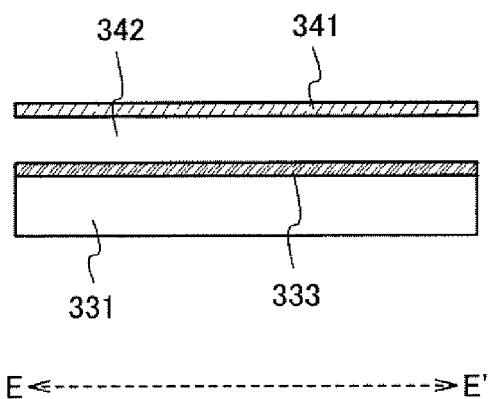
Figure 11:
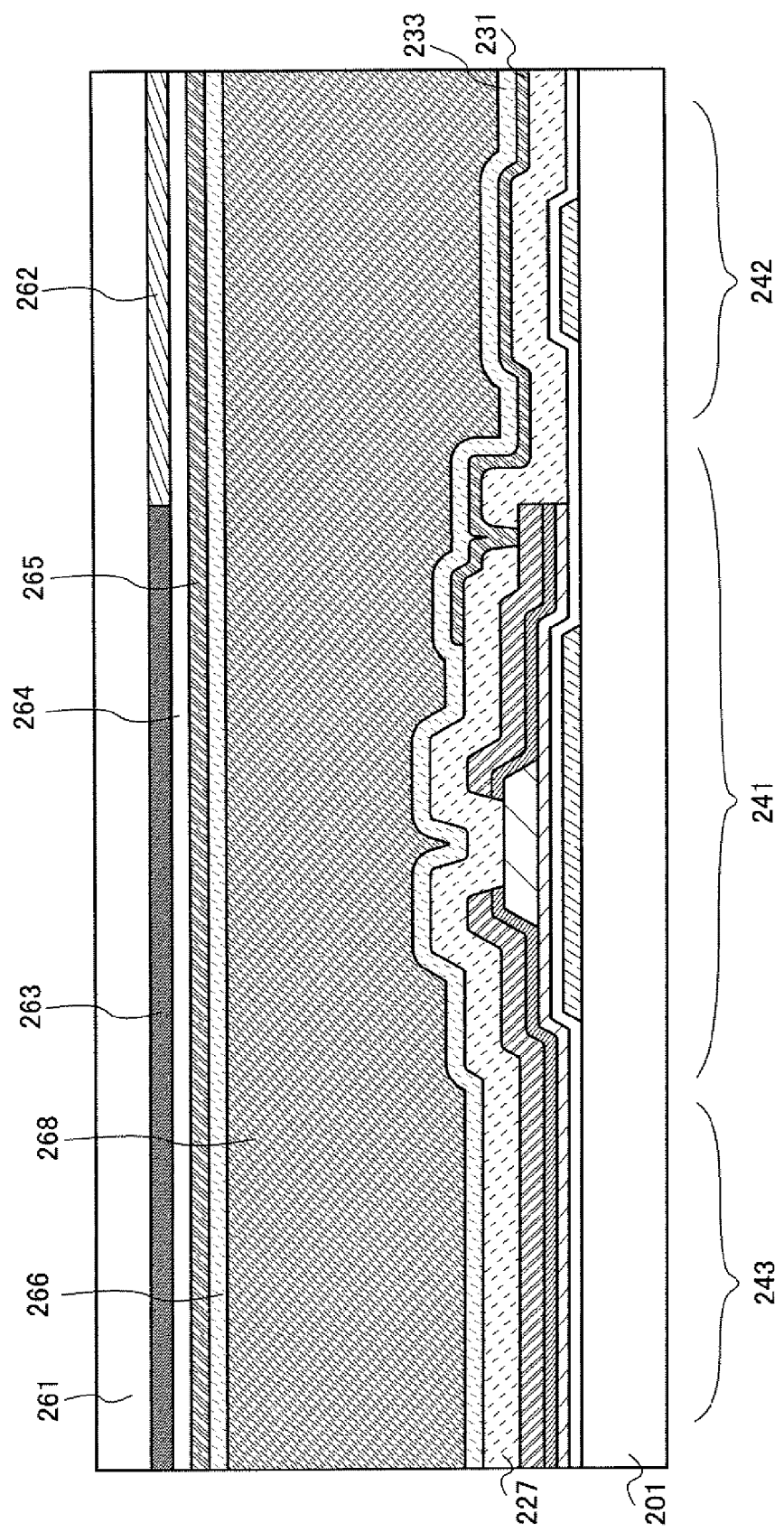
FIG. 11 is a cross-sectional view of a liquid crystal display device.

FIG. 10A is a perspective view of the completed microstructure. FIG. 10B is a cross-sectional view along the line E-E' in FIG. 10A. Note that FIG. 9D is a cross-sectional view along the line D-D' in FIG. 10A.

Since nothing is formed on a side surface in the E-E' direction, an etchant enters from the side surface when the sacrificial layer 334 is etched. Thus, the sacrificial layer 334 can be etched.

FIGS. 23A to 23D and FIGS. 24A to 24D illustrate microstructures having other structures.

Figure 23A:
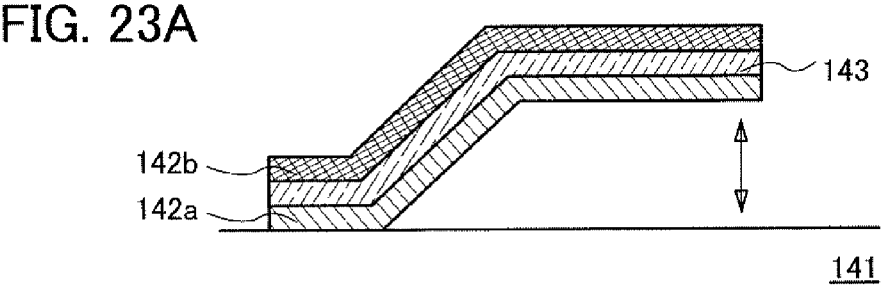
FIGS. 23A to 23D are cross-sectional views of microstructures.

FIG. 23A illustrates a microstructure which includes, over a substrate 141, an electrode 142a, an electrode 142b, and a piezoelectric material 143 interposed between the electrodes 142a and 142b. As the piezoelectric material, aluminum nitride or zinc oxide can be used. The electrodes 142a and 142b can be formed of, for example, a metal film. When voltage is applied to at least one of the electrodes 142a and 142b, the microstructure moves up and down, and liquid crystal molecules can be excited.

Figure 23B:
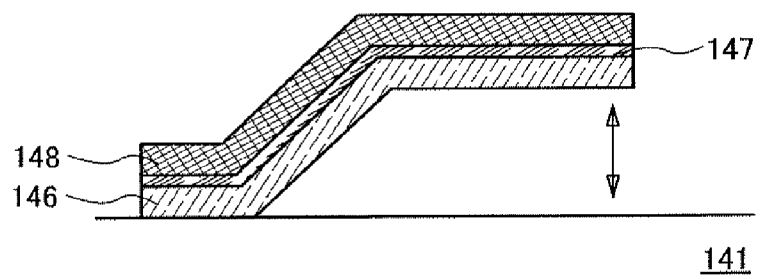

FIG. 23B illustrates a microstructure in which a first material film 146 and a second material film 148 which have different stresses from each other are formed over the substrate 141, and a heater 147 formed of a thermally conductive material is provided between the first material film 146 and the second material film 148. When the heater 147 is heated, the microstructure is warped upward or downward due to the difference in the stress between the first material film 146 and the second material film 148. When heating of the heater 147 is stopped, the microstructure is likely to return to a previous state. By heating the heater 147, the microstructure is driven, and liquid crystal molecules can be excited.

The microstructures illustrated in FIGS. 23A and 23B may be formed by stacking material films which are to serve as the electrode 142a, the piezoelectric material 143, and the electrode 142b or material films which are to serve as the first material film 146, the heater 147, and the second material film 148 and removing part of the material films by etching or the like.

Figure 23C:
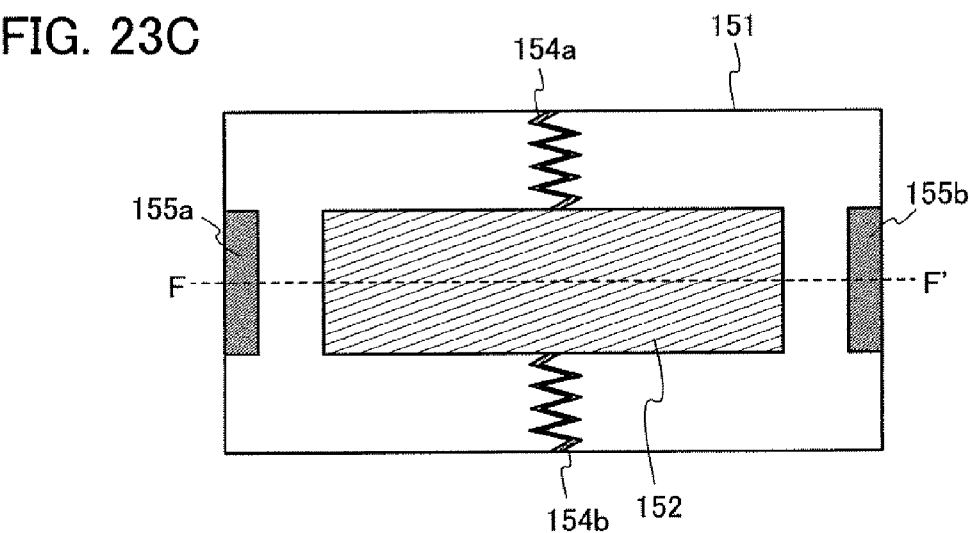
Figure 23D:
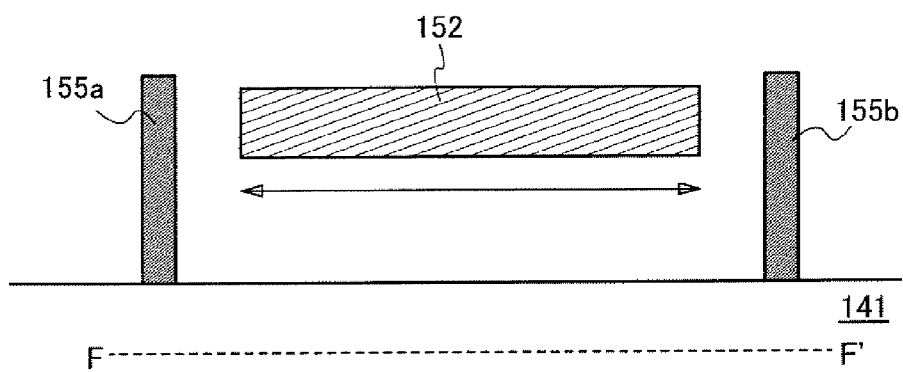

FIG. 23C is a top view of a microstructure which includes springs 154a and 154b arranged in a structure body 151, a conductive material 152 held by the springs 154a and 154b, and conductive materials 155a and 155b facing the conductive material 152. The conductive material 152 may be formed using, for example, a semiconductor film to which an impurity element imparting one conductivity type is added. The springs 154a and 154b may be formed using a metal film, for example. FIG. 23D is a cross-sectional view of the microstructure along the line F-F' in FIG. 23C.

The springs 154a and 154b are formed of a material used for a wiring or the like. When voltage is applied at least one of between the conductive material 155a and the conductive material 152, and between the conductive material 155b and the conductive material 152, electrostatic attractive force acts between the conductive materials and the conductive material 152 moves therebetween. Thus, liquid crystal molecules can be excited.

Figure 24A:
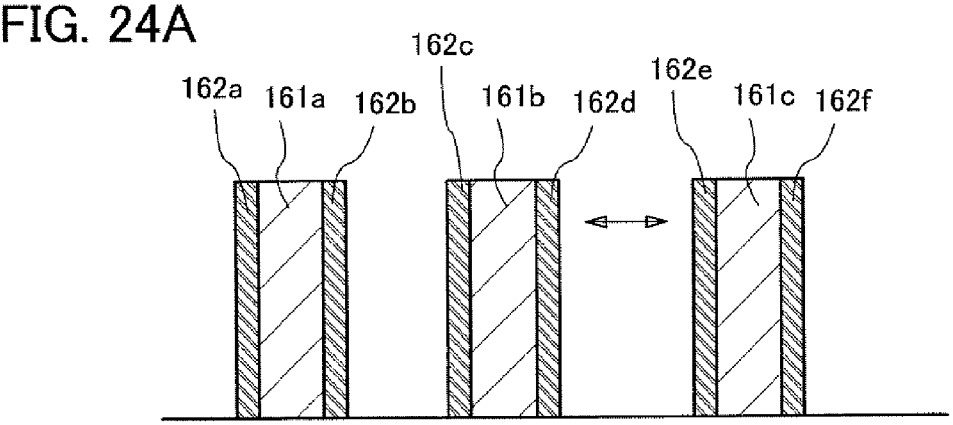
FIGS. 24A to 24D are cross-sectional views of microstructures.
Figure 24B:
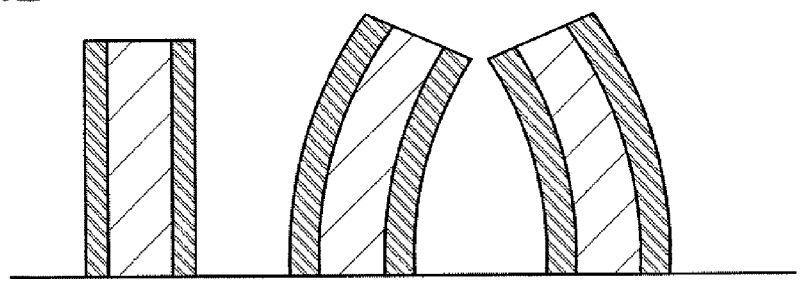

In FIGS. 24A and 24B, over the substrate 141, conductive materials 162a and 162b are formed on side surfaces of a structure body 161a; conductive materials 162c and 162d are formed on side surfaces of a structure body 161b; and conductive materials 162e and 162f are formed on side surfaces of a structure body 161c. When voltage is applied to the conductive materials 162d and 162e in a state illustrated in FIG. 24A, the structure bodies 161b and 161c attract each other due to electrostatic attractive force between the conductive materials 162d and 162e. When application of voltage is stopped, the structure bodies 161b and 161c are apart from each other. Moreover, when voltage is applied to conductive materials 162b and 162c, the structure bodies 161a and 161b attract each other due to electrostatic attractive force between the conductive materials 162b and 162c. In such a manner, the structure body 161b can be moved right and left. By using such motion, liquid crystal molecules can be excited.

Figure 24C:
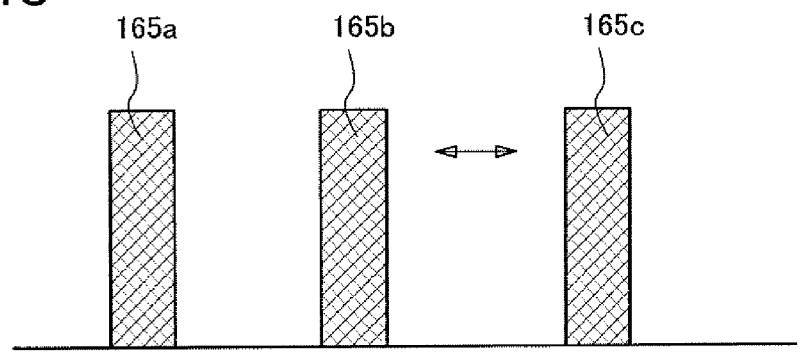
Figure 24D:
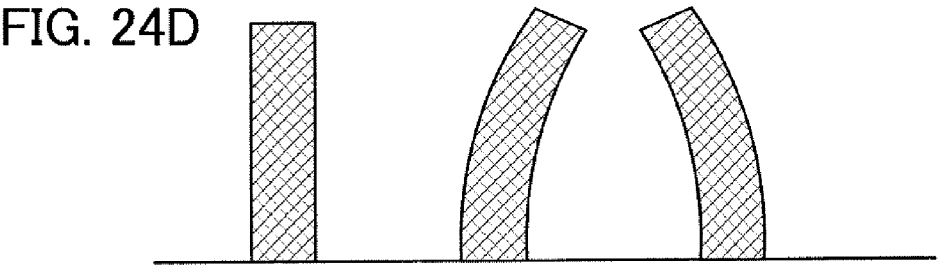

FIGS. 24C and 24D illustrate a microstructure in which the structure bodies 161a to 161c in FIGS. 24A and 24B are formed of a conductive material. Conductive materials 165a, 165b, and 165c are formed over the substrate 141. When voltage is applied to the conductive materials 165b and 165c, the conductive materials 165b and 165c attract each other due to electrostatic attractive force therebetween. When application of voltage is stopped, the conductive materials 165b and 165c are apart from each other. Moreover, when voltage is applied to the conductive materials 165a and 165b, the conductive materials 165a and 165b attract each other due to electrostatic attractive force therebetween. In such a manner, the conductive material 165b can be moved right and left. By using such motion, liquid crystal molecules can be excited.

Next, an active matrix liquid crystal display device in which the microstructure in this embodiment mode is incorporated is described below.

In an active matrix display device, active elements (e.g., thin film transistors (TFTs)) are arranged in matrix corresponding to respective pixels in a pixel portion which is to be a display region. A TFT, as a switching element, controls voltage applied to a pixel so that a desired image is displayed.

Figure 4:
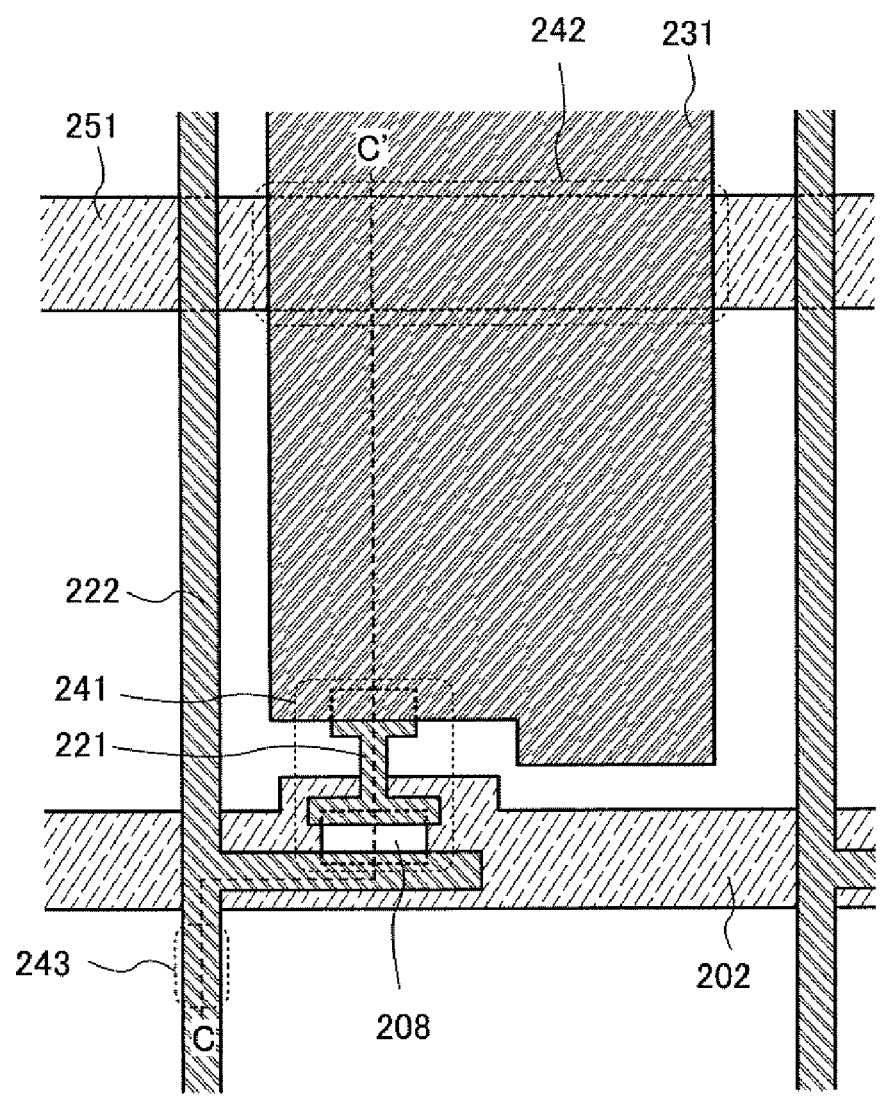
FIG. 4 is a top view of a liquid crystal display device.
Figure 7:
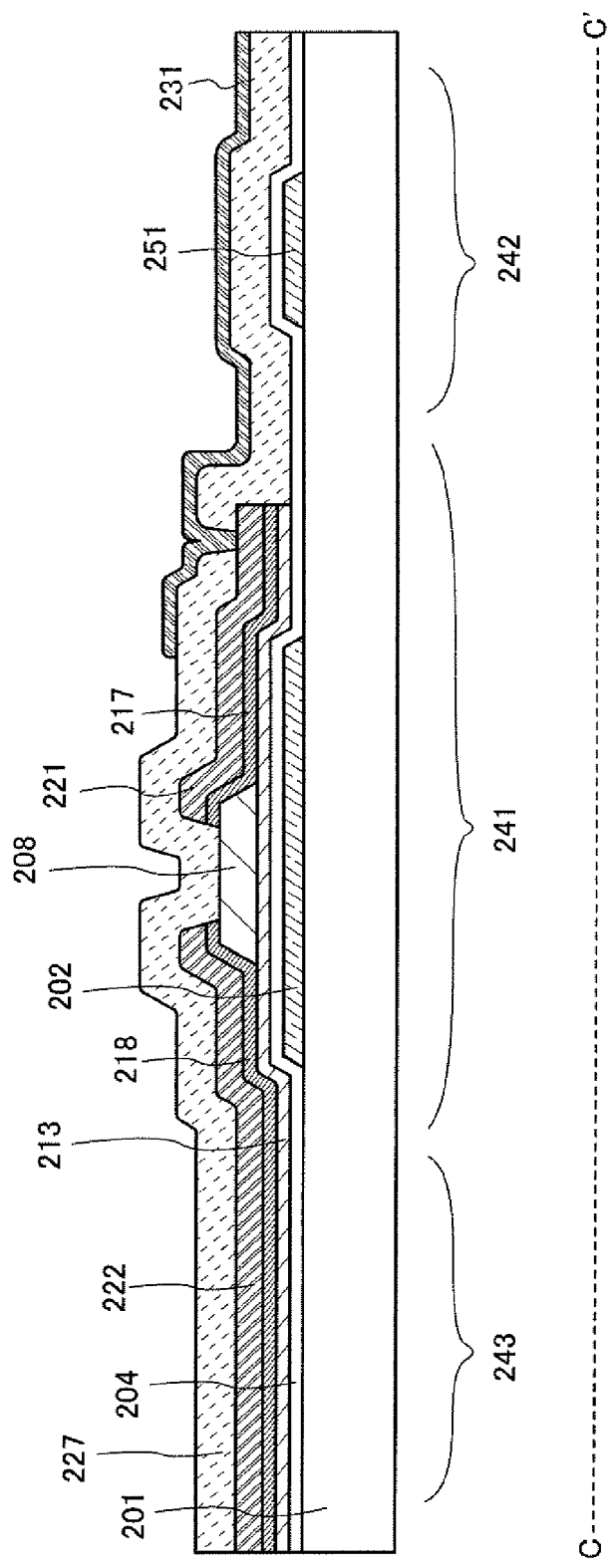
FIG. 7 is a cross-sectional view of a liquid crystal display device.

FIG. 4, FIGS. 5A to 5C, FIGS. 6A and 6B, and FIG. 7 illustrate examples of an inverted staggered TFT having a channel stopper structure and a pixel portion including the inverted staggered TFT. FIG. 4 is a top view of one pixel and a peripheral portion thereof. FIG. 7 is a cross-sectional view along the line C-C' in FIG. 4. FIGS. 5A to 5C and FIGS. 6A and 6B are cross-sectional views illustrating manufacturing steps up to the state in FIG. 7.

Note that a TFT as a switching element is not limited to an inverted staggered TFT and may be another bottom gate TFT or a top gate TFT. Further, a TFT may have a channel etch structure instead of a channel stopper structure.

First, a first conductive film 252 is formed over a substrate 201, and then, resist masks 253 are formed over the first conductive film 252 (see FIG. 5A).

Here, a resist mask is formed through steps in which a resist material is applied, exposed to light using a photomask, and developed. When the applied resist material is exposed to light shed from above one photomask is necessary to form a resist mask. That is, a first photomask is necessary to form the resist masks 253.

The first conductive film 252 is etched using the resist masks 253 as masks, so that a gate wiring 202 and a capacitor wiring 251 are formed. Next, after the resist masks 253 are removed, a gate insulating film 204, a semiconductor layer 205, and an insulating film 206 are formed. Then, a resist mask 209 is formed in a region where a channel protection film 208 is to be formed (see FIG. 5B). That is, a second photomask needs to be used to form the resist mask 209.

Next, the insulating film 206 is etched using the resist mask 209 as a mask, so that the channel protection film 208 is formed. After the resist mask 209 is removed, a semiconductor layer 211 containing an impurity element imparting one conductivity type and a second conductive film 212 are formed over the semiconductor layer 205 and the channel protection film 208. Then, resist masks 225 are formed over the second conductive film 212 (see FIG. 5C). That is, a third photomask is used.

The second conductive film 212 and the semiconductor layers 205 and 211 are etched using the resist masks 225 as masks. At this time, the channel protection film 208 and the gate insulating film 204 function as etching stoppers. Accordingly, the second conductive film 212 is divided to form a source wiring 222 and a drain electrode 221. Moreover, the semiconductor layer 211 containing the impurity element imparting one conductivity type is also divided to serve as a source region 218 and a drain region 217. Further, the semiconductor layer 205 is also etched to be an i-type semiconductor layer 213, and an edge portion of the i-type semiconductor layer 213 is aligned with edge portions of the drain region 217 and the drain electrode 221. Next, after the resist masks 225 are removed, a protective film 227 is formed on the entire surface, and then, resist masks 228 are formed (see FIG. 6A). That is, a fourth photomask is used.

The protective film 227 is etched using the resist masks 228 to form a contact hole 273. After the resist masks 228 are removed, a third conductive film 229 is formed, and a resist mask 234 is formed in a region where a pixel electrode is to be formed over the third conductive film 229 (see FIG. 6B). That is, a fifth photomask is used.

The third conductive film 229 is etched using the resist mask 234 as a mask, so that a pixel electrode 231 is formed. Then, after the resist mask 234 is removed, the pixel portion illustrated in FIG. 7 is completed. Note that FIG. 4 is a top view of FIG. 7.

As illustrated in FIG. 7, a TFT region 241, a capacitor region 242, and a wiring region 243 are provided over the substrate 201. In the TFT region 241, the gate wiring 202, the gate insulating film 204, the i-type semiconductor layer 213 including a channel formation region, the channel protection film 208 formed of the insulating film, the source region 218 and the drain region 217 which are formed of the semiconductor layer containing the impurity element imparting one conductivity type, the source wiring 222, the drain electrode 221, the protective film 227, and the pixel electrode 231 are provided.

In the capacitor region 242, the capacitor wiring 251, the gate insulating film 204, the protective film 227, and the pixel electrode 231 are provided. Further, in the wiring region 243, the source wiring 222 is provided.

In the capacitor region 242, the pixel electrode 231 and the capacitor wiring 251 formed of the same material and in the same step as those of the gate wiring 202 serve as upper and lower electrodes, and the gate insulating film 204 and the protective film 227 which are interposed between the electrodes serve as dielectric substances.

An i-type semiconductor layer is also called an intrinsic semiconductor layer. An i-type semiconductor layer refers to a semiconductor layer in which the concentration of an impurity element imparting one conductivity type, that is, an impurity element imparting p-type or n-type conductivity is equal to or less than $1 \times 10^{20}$ cm$^{-3}$ and the concentration of oxygen and nitrogen is equal to or less than $9 \times 10^{19}$ cm$^{-3}$, and the photoconductivity is 100 times or more than the dark conductivity. The intrinsic semiconductor layer may contain an impurity element belonging to Group 13 or 15 of the periodic table. This is because a microcrystalline semiconductor layer has weak n-type conductivity when an impurity element for controlling valence electrons is not added intentionally, and thus, if an intrinsic semiconductor layer is formed of a microcrystalline semiconductor layer, an impurity element imparting p-type conductivity is added to the i-type microcrystalline semiconductor layer intentionally or unintentionally in some cases at the same time as or after the film formation.

In this embodiment mode, a non-doped amorphous silicon film is used as the i-type semiconductor layer 213. Alternatively, a germanium film, a silicon germanium film, or the like may be used as the semiconductor layer without limitation to a silicon film.

In addition, for the impurity element imparting one conductivity type, phosphorus (P) or arsenic (As) may be used as an impurity element imparting n-type conductivity and boron (B) may be used as an impurity element imparting p-type conductivity. In this embodiment mode, an n-channel TFT is formed using phosphorus (P) as the impurity element imparting one conductivity type.

Further, as the semiconductor layer 205 in FIG. 5B and the semiconductor layer 211 in FIG. 5C, which contains the impurity element imparting one conductivity type, an amorphous semiconductor layer, a microcrystalline semiconductor layer, a polycrystalline semiconductor layer, or a single crystal semiconductor layer can be used.

A microcrystalline semiconductor layer is also referred to as a semi-amorphous semiconductor (in this specification, also referred to as SAS) layer and contains a semiconductor having an intermediate structure between an amorphous semiconductor and a semiconductor having a crystalline structure (including a single crystal structure and a polycrystalline structure). The semi-amorphous semiconductor layer has a third state which is stable in terms of free energy and is a crystalline substance having short-range order and lattice distortion. The crystal grain with a diameter of 0.5 nm to 20 nm can exist by being dispersed in a non-single crystal semiconductor film. Note that the semi-amorphous semiconductor layer includes a microcrystalline semiconductor layer (a microcrystal semiconductor film) in its category.

A semi-amorphous silicon film is one example of a semi-amorphous semiconductor layer. The Raman spectrum of the semi-amorphous silicon layer is shifted to a lower wavenumber side than 520 cm$^{-1}$, and the diffraction peaks of (111) and (220) that are thought to be caused by a silicon crystal lattice are observed in X-ray diffraction. Moreover, at least 1 atomic % or more of hydrogen or halogen is contained to terminate dangling bonds. In this specification, such a silicon layer is referred to as a semi-amorphous silicon layer for the sake of convenience. Further, a rare gas element such as helium, argon, krypton, or neon is contained therein to further promote lattice distortion, whereby the stability is enhanced, and a favorable semi-amorphous semiconductor layer can be obtained.

In addition, a semi-amorphous silicon layer can be obtained by glow discharge decomposition of a gas containing silicon. A typical example of a gas containing silicon is $SiH_4$, and $Si_2H_6$, $SiH_2Cl_2$, $SiHCl_3$, $SiCl_4$, $SiF_4$, or the like can also be used. The semi-amorphous silicon layer can be easily formed using the gas containing silicon diluted with hydrogen or a gas in which one or more of rare gas elements selected from helium, argon, krypton, or neon is/are added to hydrogen. The gas containing silicon is preferably diluted with a 2- to 1000-fold dilution factor. Alternatively, a carbide gas such as $CH_4$ or $C_2H_6$; a germanium gas such as $GeH_4$ or $GeF_4$; $F_2$; or the like may be mixed into the gas containing silicon to adjust the energy bandwidth to be 1.5 eV to 2.4 eV or 0.9 eV to 1.1 eV.

For a single crystal semiconductor layer, the following steps may be performed: a separation layer is formed in a single crystal semiconductor substrate; a single crystal semiconductor layer is separated along the separation layer; and the separated single crystal semiconductor layer is attached to the substrate 201. For example, hydrogen ions are added to a single crystal silicon substrate so as to form a separation layer; a silicon oxide film is formed on a surface of the single crystal silicon substrate; physical force is applied to the single crystal silicon substrate so as to separate the separation layer; and the silicon oxide film and the substrate 201 are attached to each other, whereby a single crystal silicon layer is formed over the substrate 201.

Figure 8:
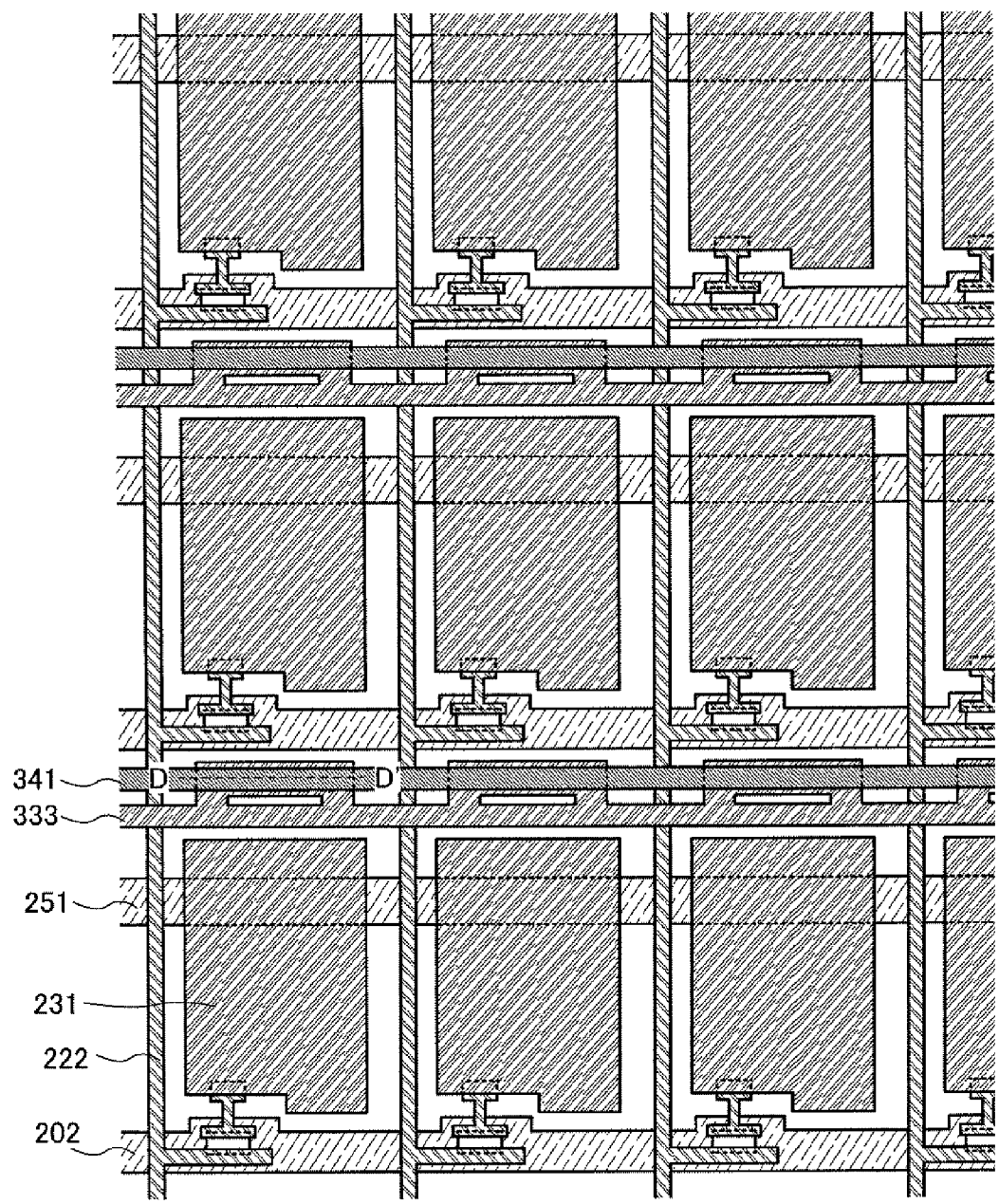
FIG. 8 is a top view of a liquid crystal display device including a microstructure.

FIG. 8 is a top view in which the microstructure illustrated in FIG. 10A is combined with the pixel illustrated in FIG. 4. Note that FIG. 9D is a cross-sectional view along the line D-D' in FIG. 8. The lower electrode 333 is formed of the same material and in the same step as those of the pixel electrode 231. The lower electrode 333 in one pixel is electrically connected to the lower electrode 333 in the next pixel through a wiring. In FIG. 8, the wiring and the lower electrode 333 are formed of the same material; however, the wiring and the lower electrode 333 may be formed of different conductive materials and electrically connected to each other.

In FIG. 8, the upper electrode 341 is formed as a wiring. The upper electrodes 341 in a plurality of pixels are formed of the same material in the same step. Alternatively, the upper electrode 341 in one pixel and the upper electrode 341 in the next pixel may be formed of different conductive materials and electrically connected to each other.

As illustrated in FIG. 8, a microstructure is provided in a pixel and operated by transmitting a signal to the microstructure when a liquid crystal element is changed from an on state to an off state. Liquid crystal molecules are excited by operating the microstructure, so that the speed at which the liquid crystal molecules are changed from an on state to an off state can be increased.

Note that in FIG. 8, one microstructure is provided in one pixel; however, the number of the microstructures is not limited to this. A plurality of microstructures may be formed in one pixel. Alternatively, one microstructure may be provided for a plurality of pixels as long as the time it takes for the liquid crystal molecules to be aligned from an on state to an off state can be reduced.

Figure 21:
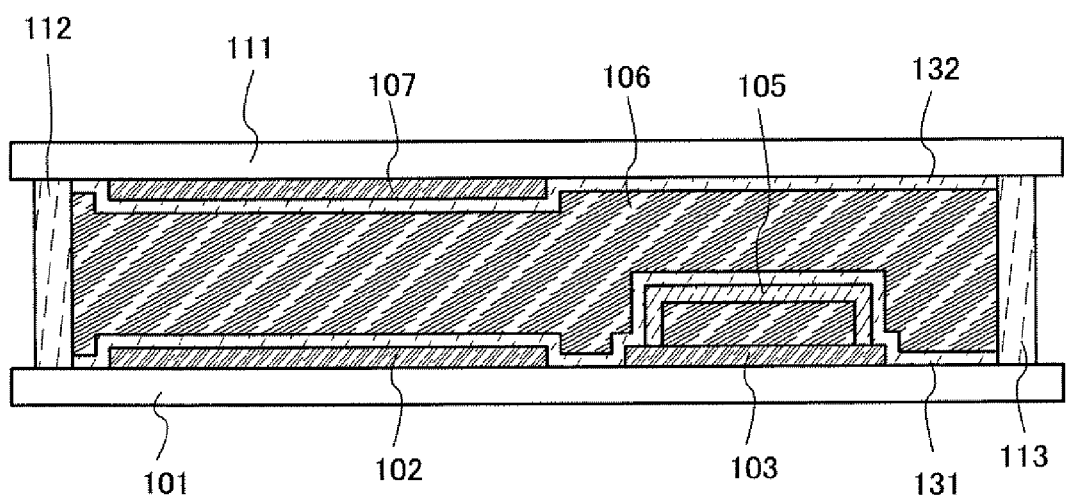
FIG. 21 is a cross-sectional view of a liquid crystal display device including a microstructure.

FIG. 21 illustrates an example of a liquid crystal display device including a microstructure. In addition to the structure in FIG. 1, alignment films 131 and 132 for aligning liquid crystal molecules may be formed so as to cover a microstructure as illustrated in FIG. 21. In FIG. 21, the alignment films 131 and 132 are formed so as to cover the substrates 101 and 111, respectively. Such alignment films 131 and 132 may be formed by a spin coating method.

Figure 22:
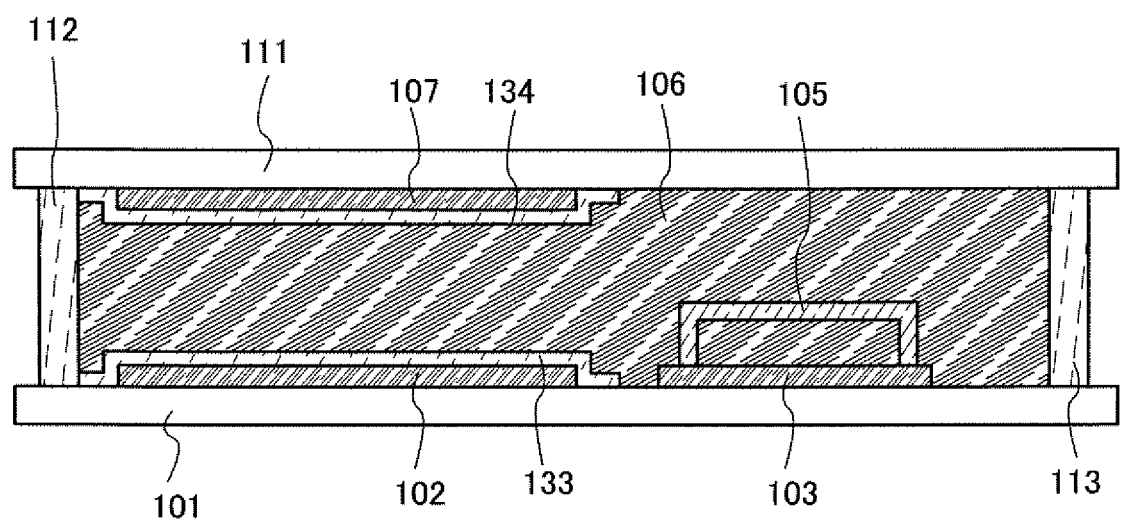
FIG. 22 is a cross-sectional view of a liquid crystal display device including a microstructure.

In contrast, FIG. 22 illustrates a liquid crystal display device having a structure where an alignment film does not cover a microstructure. An alignment film 133 in FIG. 22 is formed in a region where the microstructure is not formed. Note that an alignment film 134 on the substrate 111 may be formed in a region corresponding to the alignment film 133 or formed so as to cover the entire surface of the substrate 111. Such alignment films 133 and 134 may be formed by an ink-jet method or a printing method.

[Embodiment Mode 2]

In this embodiment mode, steps for manufacturing a liquid crystal display device leading up to completion by using a TFT substrate manufactured in Embodiment Mode 1 are described below with reference to FIG. 11, FIGS. 12A to 12D, and FIG. 13.

An alignment film 233 is formed so as to cover the protective film 227 and the pixel electrode 231 over a TFT substrate. Note that the alignment film 233 may be formed by a droplet discharging method, a screen printing method, or an offset printing method. After that, rubbing treatment is performed on a surface of the alignment film 233, and a liquid crystal material 268 is dropped.

Then, a color filter including a color layer 262, a light-blocking layer (a black matrix) 263, and an overcoat layer 264 is provided on a counter substrate 261. Further, a counter electrode 265 formed using a light-transmitting conductive film is formed, and an alignment film 266 is formed thereon (see FIG. 1). Since the counter electrode 265 is formed using a light-transmitting conductive film, a liquid crystal display device in this embodiment mode is a transmissive liquid crystal display device. Alternatively, when the counter electrode 265 is formed as a reflective electrode, the liquid crystal display device in this embodiment mode is a reflective liquid crystal display device.

Figure 12A:
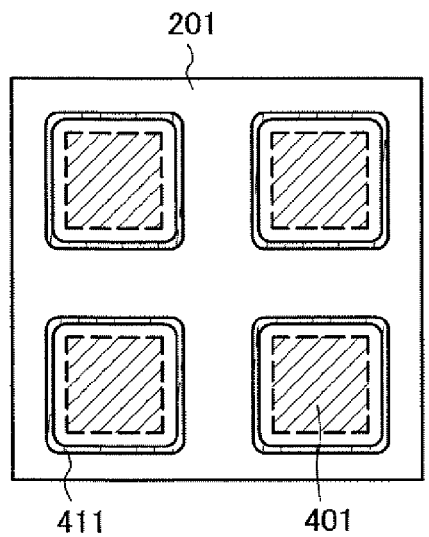
FIGS. 12A to 12D are top views illustrating steps for manufacturing a liquid crystal display device.
Figure 12B:
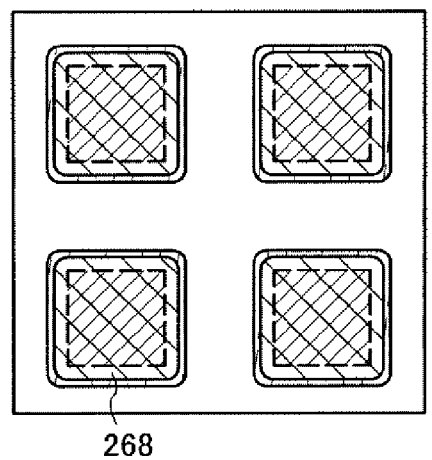

Then, a sealing material 411 is formed by a dispenser so as to surround a region overlapping with a pixel portion 401 (see FIG. 12A). Here, an example is shown in which the sealing material 411 is formed so as to surround the pixel portion 401 in order to drop the liquid crystal material 268. Alternatively, a sealing material may be provided so as to surround the pixel portion 401 and have an opening portion, and a dipping method (a pumping method) in which liquid crystal is injected using a capillary phenomenon may be used after the TFT substrate is attached to the counter substrate 261.

Figure 12C:
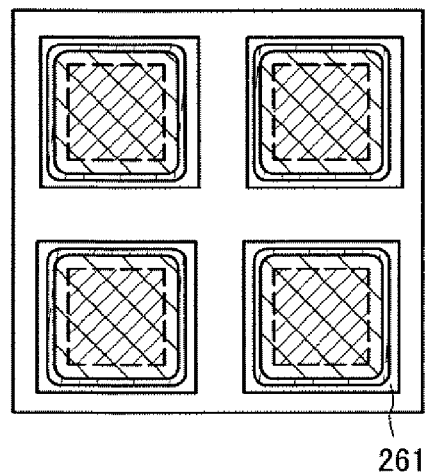
Figure 12D:
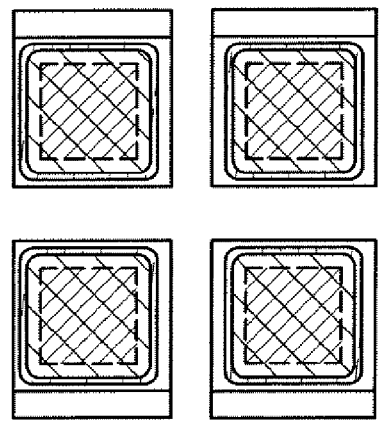

Next, the liquid crystal material 268 is dropped under reduced pressure so that air bubbles do not enter (see FIG. 12B), and the substrate 201 and the counter substrate 261 are attached to each other (see FIG. 12C). The liquid crystal material 268 is dropped in the region surrounded by the sealing material 411 once or a plurality of times.

As an alignment mode of the liquid crystal material 268, a TN mode is used in many cases, in which liquid crystal molecules are twist-aligned at a twist angle of 90° between the TFT substrate and the counter substrate 261. When a TN-mode liquid crystal display device is manufactured, the substrates are attached so that the rubbing directions are perpendicular to each other.

Note that a space between a pair of substrates may be maintained by dispersing a spherical spacer, forming a columnar spacer made of a resin, or mixing a filler in the sealing material 411. The columnar spacer is formed of an organic resin material containing at least one of acrylic, polyimide, polyimide amide, and epoxy as its main component; a material of any one of silicon oxide, silicon nitride, and silicon oxide containing nitrogen; or an inorganic material including a layered film of the above materials.

Next, the substrate is divided. In order to obtain a plurality of panels from one substrate, the substrate is divided into a plurality of panels. Moreover, when one panel is obtained from one substrate, a division step can be omitted by attaching a counter substrate which is cut in advance to the substrate (see FIG. 12D).

Figure 13:
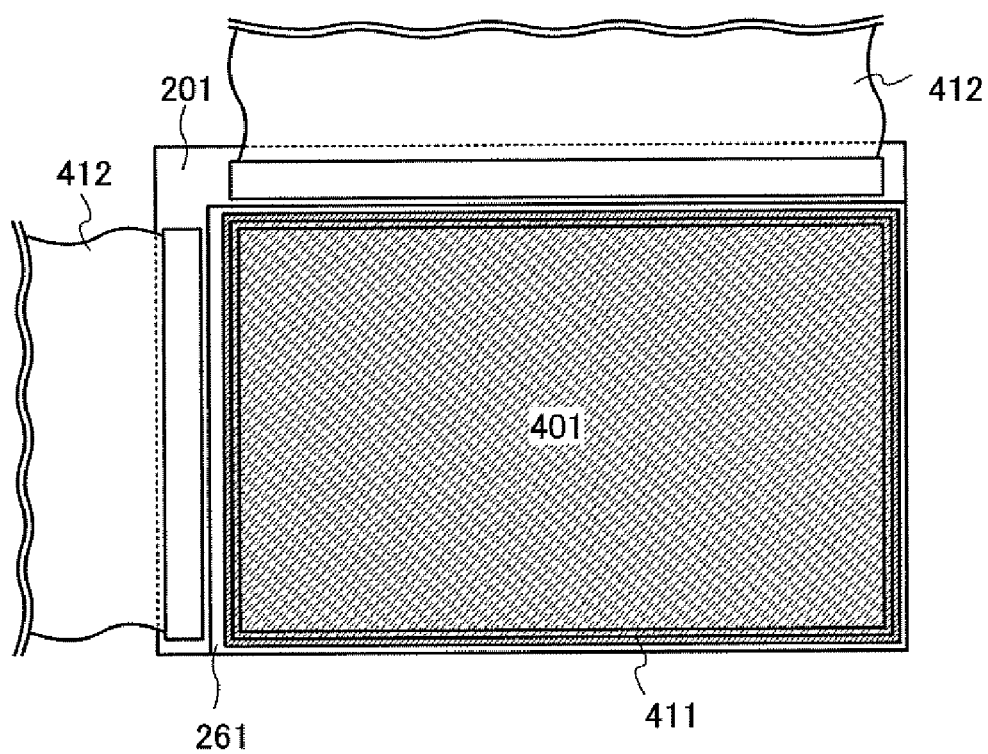
FIG. 13 is a top view illustrating a step for manufacturing a liquid crystal display device.

Then, an FPC (flexible printed circuit) 412 is attached through an anisotropic conductive layer by a known technique (see FIG. 13). Through the above steps, a liquid crystal display device is completed. Further, an optical film is attached if necessary. In the case of a transmissive liquid crystal display device, a polarizing plate is attached to both the TFT substrate and the counter substrate. In such a manner, the liquid crystal display device in this embodiment mode is manufactured.

In this embodiment mode, a microstructure is connected to a microstructure in the next pixel through a wiring as particularly illustrated in FIG. 8. Therefore, when the microstructure is driven, microstructures connected to one wiring or all the microstructures are driven at the same time. In such a structure, a switching element, for example, a TFT may be formed for each microstructure to control driving of the microstructure. The response speed of liquid crystal molecules in each pixel is improved by providing a switching element for each microstructure, whereby a clearer image can be realized.

[Embodiment Mode 3]

Examples of electronic devices to which the invention disclosed in this specification is applied are television sets, cameras such as video cameras and digital cameras, goggle displays, navigation systems, audio reproducing devices (e.g., car audio), computers, game machines, portable information terminals (e.g., mobile computers, mobile phones, portable game machines, and e-book readers), and image reproducing devices provided with storage media (specifically, a device which can reproduce a storage medium such as a digital versatile disc (DVD) and includes a display capable of displaying the image).

FIG. 14, FIG. 15, FIGS. 16A and 16B, FIGS. 17A and 17B, FIG. 18, FIGS. 19A to 19E, and FIGS. 20A and 20B illustrate specific examples of such electronic devices.

Figure 14:
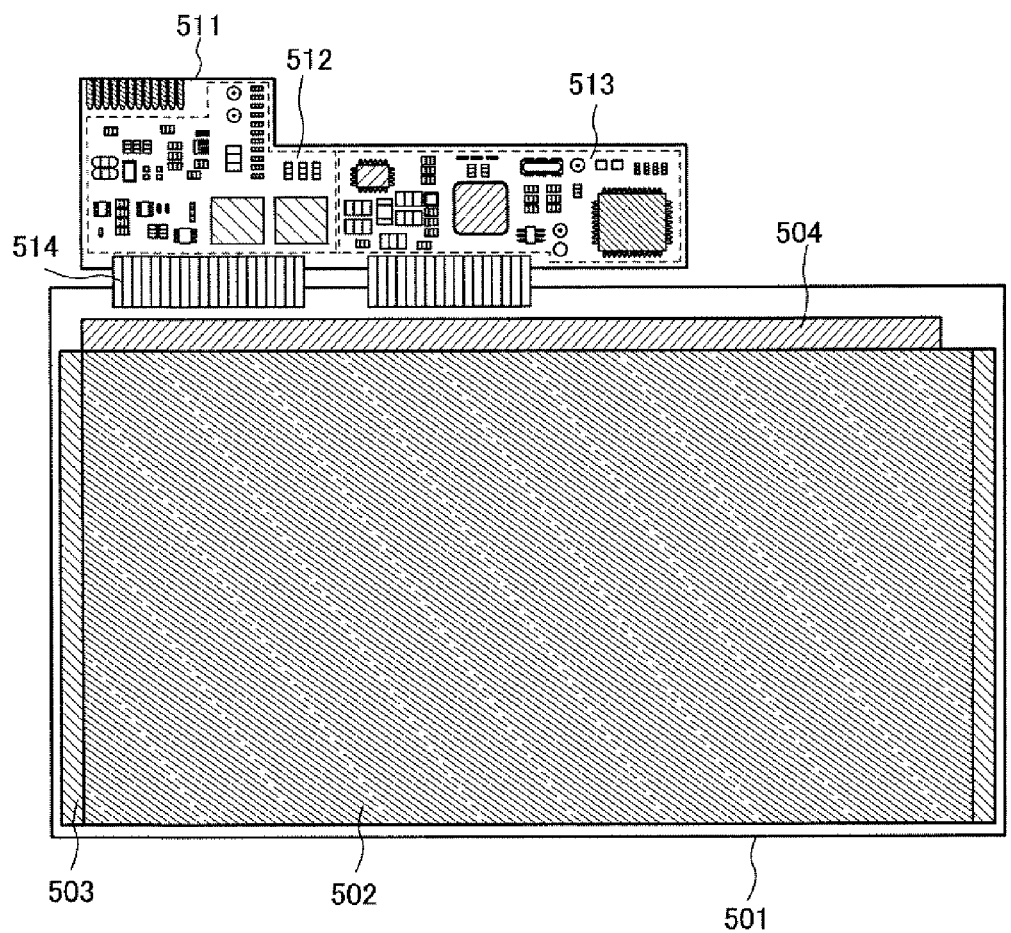
FIG. 14 illustrates an example of an electronic device.

FIG. 14 illustrates a liquid crystal module in which a liquid crystal display panel 501 and a circuit board 511 are combined. In the circuit board 511, a control circuit 512, a signal dividing circuit 513, and the like are formed. The circuit board 511 is electrically connected to the liquid crystal display panel 501 formed using the invention disclosed in this specification by a connection wiring 514.

The liquid crystal display panel 501 is provided with a pixel portion 502 including a plurality of pixels, a scan line driver circuit 503, and a signal line driver circuit 504 for supplying a video signal to a selected pixel. The pixel portion 502 may be formed based on Embodiment Modes 1 and 2. The scan line driver circuit 503 and the signal line driver circuit 504 may be formed using a chip and connected to the pixel portion 502 with an FPC or the like.

Figure 15:
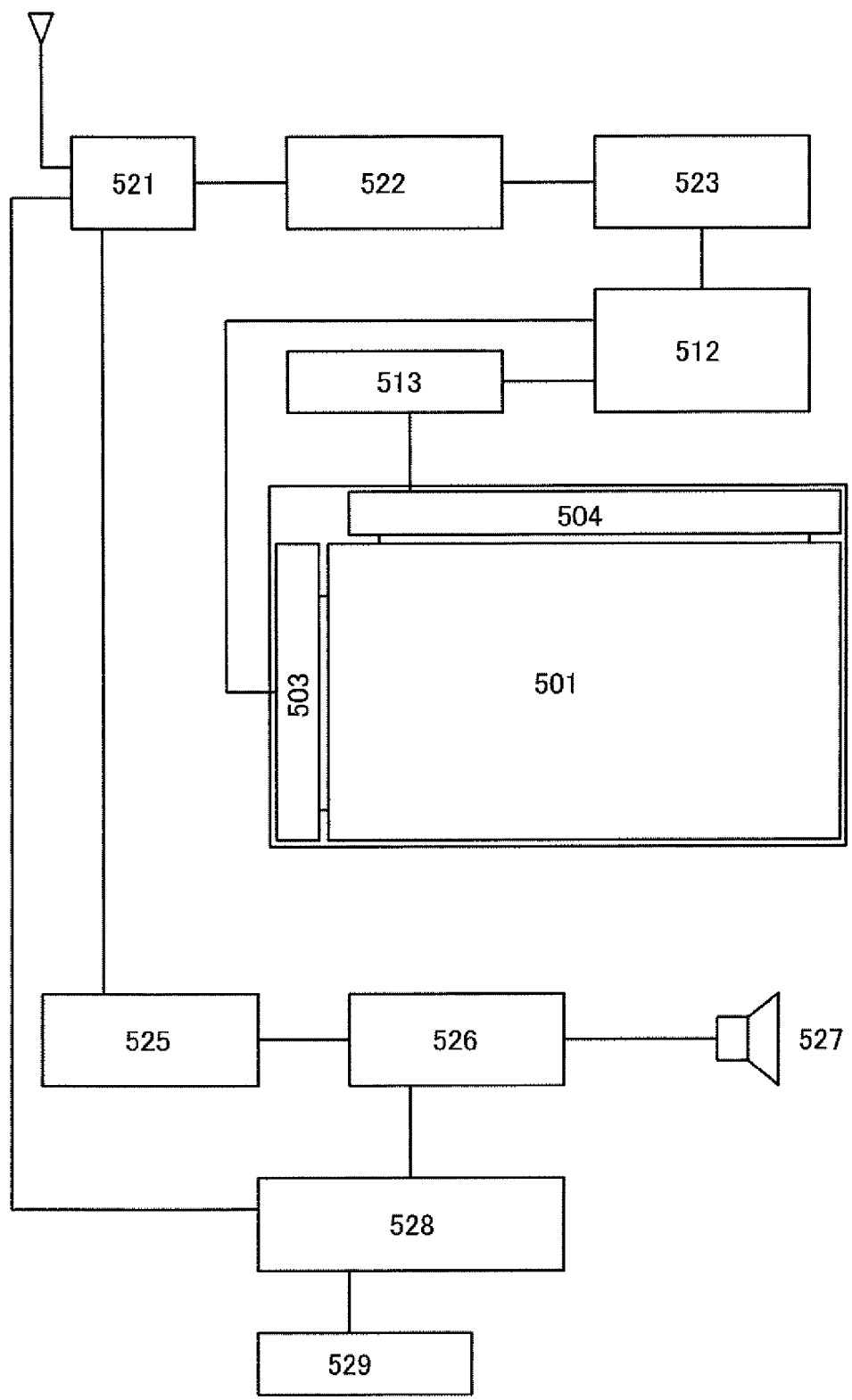
FIG. 15 illustrates an example of an electronic device.

A liquid crystal television receiver can be completed with the liquid crystal module illustrated in FIG. 14. FIG. 15 is a block diagram illustrating a main structure of a liquid crystal television receiver. A tuner 521 receives video signals and audio signals. The image signal is processed by an image signal amplifier circuit 522; an image signal processing circuit 523 for converting a signal outputted from the image signal amplifier circuit 522 into a color signal corresponding to each color of red, green, and blue; and a control circuit 512 for converting the image signal into an input specification of a driver IC. The control circuit 512 outputs signals to both the scan line side and the signal line side. When digital driving is performed, a structure may be employed in which the signal dividing circuit 513 is provided on the signal line side and an input digital signal is divided into m signals to be supplied.

Among the signals received by the tuner 521, an audio signal is transmitted to an audio signal amplifier circuit 525, and an output thereof is supplied to a speaker 527 through an audio signal processing circuit 526. A control circuit 528 receives control information on receiving station (receiving frequency) and volume from an input portion 529 and transmits signals to the tuner 521 or the audio signal processing circuit 526.

Figure 16A:
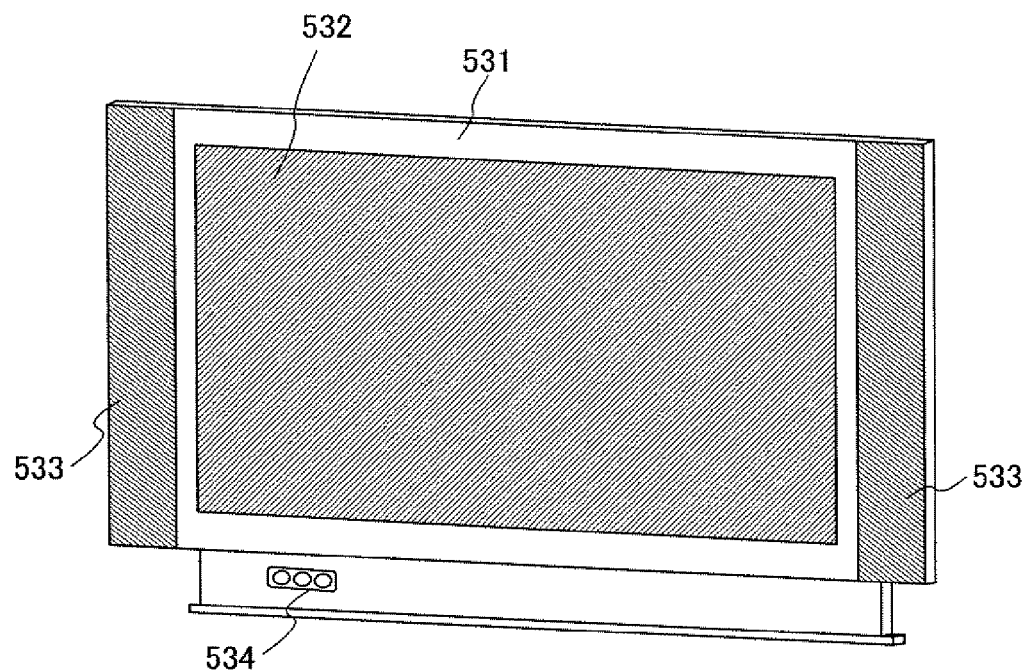
FIGS. 16A and 16B illustrate examples of electronic devices.

As illustrated in FIG. 16A, a television receiver can be completed by incorporating a liquid crystal module into a housing 531. A display screen 532 is formed using the liquid crystal module. The television receiver is also provided with a speaker 533, an operation switch 534, and the like as appropriate.

Figure 16B:
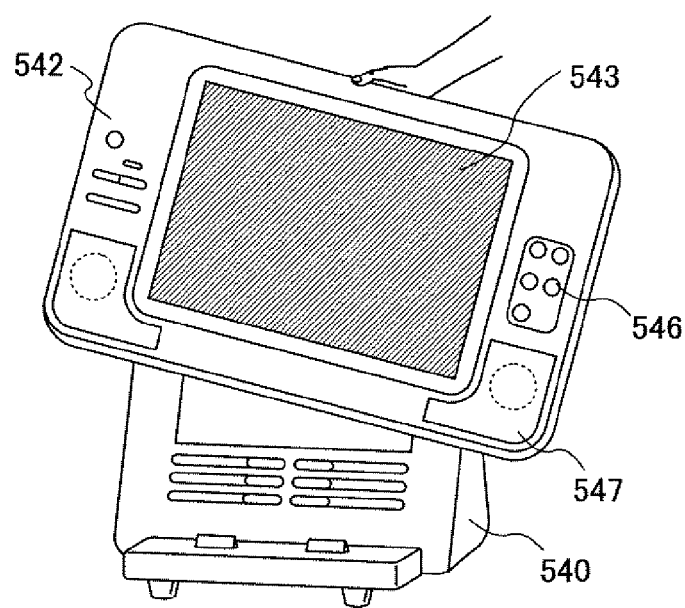

FIG. 16B illustrates a television receiver including a display which can be carried wirelessly. A battery and a signal receiver are incorporated in a housing 542. A display portion 543 and a speaker portion 547 are driven by the battery. The battery can be repeatedly charged by a charger 540. The charger 540 can transmit and receive a video signal and transmit the video signal to the signal receiver of the display. The housing 542 is controlled by an operation key 546. Moreover, the device illustrated in FIG. 16B can transmit a signal from the housing 542 to the charger 540 by operating the operation key 546. That is, the device may be an image and audio interactive communication device. Alternatively, the device can transmit a signal from the housing 542 to the charger 540 by operating the operation key 546 and can control communication of another electronic device by making another electronic device receive a signal that the charger 540 can transmit. That is, the device may be a general-purpose remote control device. The invention disclosed in this specification can be applied to the display portion 543.

By applying the invention disclosed in this specification to the television receivers illustrated in FIG. 14, FIG. 15, and FIGS. 16A and 16B, a television receiver including a display device with high response speed can be obtained.

It is needless to say that the invention disclosed in this specification is not limited to a television receiver and can be applied to a variety of applications, particularly to large display media such as an information display board at train stations, airports, or the like, and an advertisement display board on the street as well as monitors of personal computers.

Figure 17A:
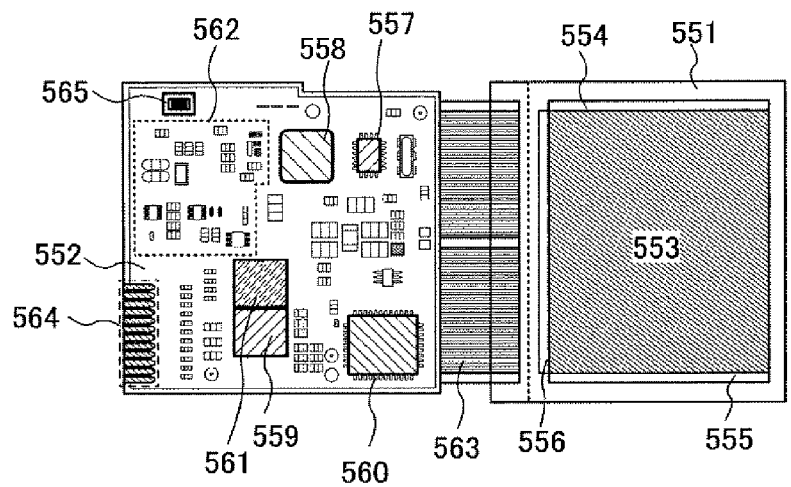
FIGS. 17A and 17B illustrate an example of an electronic device.

FIG. 17A illustrates a module in which a liquid crystal display panel 551 formed using the invention disclosed in this specification and a printed wiring board 552 are combined. The liquid crystal display panel 551 is provided with a pixel portion 553 including a plurality of pixels, a first scan line driver circuit 554, a second scan line driver circuit 555, and a signal line driver circuit 556 for supplying a video signal to a selected pixel.

The printed wiring board 552 is provided with a controller 557, a central processing unit (CPU) 558, a memory 559, a power supply circuit 560, an audio processing circuit 561, a transmission/reception circuit 562, and the like. The printed wiring board 552 and the liquid crystal display panel 551 are connected to each other through a flexible printed circuit (FPC) 563. The printed wiring board 552 may be provided with a capacitor, a buffer circuit, or the like so as to prevent noise in the power supply voltage or signals and delay of signal rising. Further, the controller 557, the audio processing circuit 561, the memory 559, the CPU 558, the power supply circuit 560, and the like can be mounted on the liquid crystal display panel 551 by a COG (chip on glass) method. By a COG method, the size of the printed wiring board 552 can be reduced.

Various control signals are inputted and outputted through an interface 564 provided on the printed wiring board 552. Moreover, an antenna port 565 for transmitting and receiving signals to/from an antenna is provided on the printed wiring board 552.

Figure 17B:
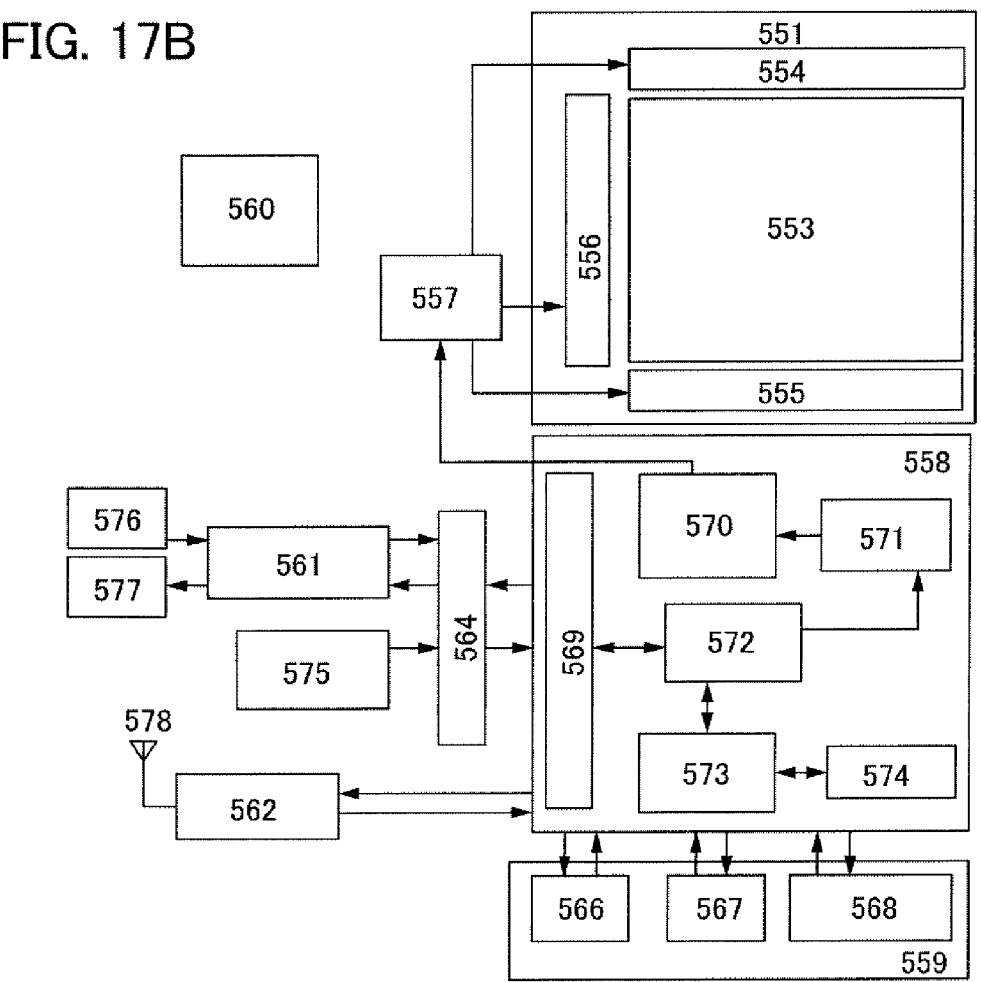

FIG. 17B is a block diagram of the module illustrated in FIG. 17A. The module includes a VRAM 566, a DRAM 567, a flash memory 568, and the like as the memory 559. The VRAM 566 stores data on an image displayed on a panel. The DRAM 567 stores image data or audio data. The flash memory 568 stores a variety of programs.

The power supply circuit 560 supplies electric power for operating the liquid crystal display panel 551, the controller 557, the CPU 558, the audio processing circuit 561, the memory 559, and the transmission/reception circuit 562. A current source may be provided in the power supply circuit 560 depending on the panel specification.

The CPU 558 includes a control signal generating circuit 570, a decoder 571, a register 572, an arithmetic circuit 573, a RAM 574, an interface 569 for the CPU 558, and the like. Various signals which are inputted to the CPU 558 through the interface 569 are once stored in the register 572, and then inputted to the arithmetic circuit 573, the decoder 571, and the like. The arithmetic circuit 573 performs an arithmetic operation based on an inputted signal and specifies an address to which various instructions are transmitted. In contrast, the signal inputted to the decoder 571 is decoded and inputted to the control signal generating circuit 570. The control signal generating circuit 570 generates a signal containing various instructions based on the inputted signal, and then transmits the signal to the address determined by the arithmetic circuit 573, specifically, the memory 559, the transmission/reception circuit 562, the audio processing circuit 561, the controller 557, or the like.

The memory 559, the transmission/reception circuit 562, the audio processing circuit 561, and the controller 557 are operated in accordance with the received instructions. The operation is briefly described below.

A signal inputted from an input means 575 is transmitted to the CPU 558 mounted on the printed wiring board 552 through the interface 564. The control signal generating circuit 570 converts the image data stored in the VRAM 566 into a predetermined format based on the signal transmitted from the input means 575 such as a pointing device or a keyboard, and transmits the data to the controller 557.

The controller 557 performs data processing on the signal including the image data transmitted from the CPU 558 in accordance with the panel specification to supply the signal to the liquid crystal display panel 551. Further, the controller 557 generates a Hsync signal, a Vsync signal, a clock signal CLK, alternating voltage (AC Cont), and a shift signal L/R based on power supply voltage inputted from the power supply circuit 560 or various signals inputted from the CPU 558 to supply the signals to the liquid crystal display panel 551.

In the transmission/reception circuit 562, signals transmitted and received as electric waves at an antenna 578 are processed. Specifically, the transmission/reception circuit 562 includes a high-frequency circuit such as an isolator, a band path filter, a voltage controlled oscillator (VCO), a low pass filter (LPF), a coupler, or a balun. A signal including audio information among signals transmitted and received by the transmission/reception circuit 562 is transmitted to the audio processing circuit 561 in accordance with an instruction from the CPU 558.

The signal including the audio information, which is transmitted in accordance with the instruction from the CPU 558, is demodulated into an audio signal by the audio processing circuit 561 and transmitted to a speaker 577. Moreover, an audio signal transmitted from a microphone 576 is modulated by the audio processing circuit 561 and transmitted to the transmission/reception circuit 562 in accordance with an instruction from the CPU 558.

The controller 557, the CPU 558, the power supply circuit 560, the audio processing circuit 561, and the memory 559 can be mounted as a package of this embodiment mode. This embodiment mode can be applied to any circuit except a high-frequency circuit such as an isolator, a band pass filter, a voltage controlled oscillator (VCO), a low pass filter (LPF), a coupler, or a balun.

Figure 18:
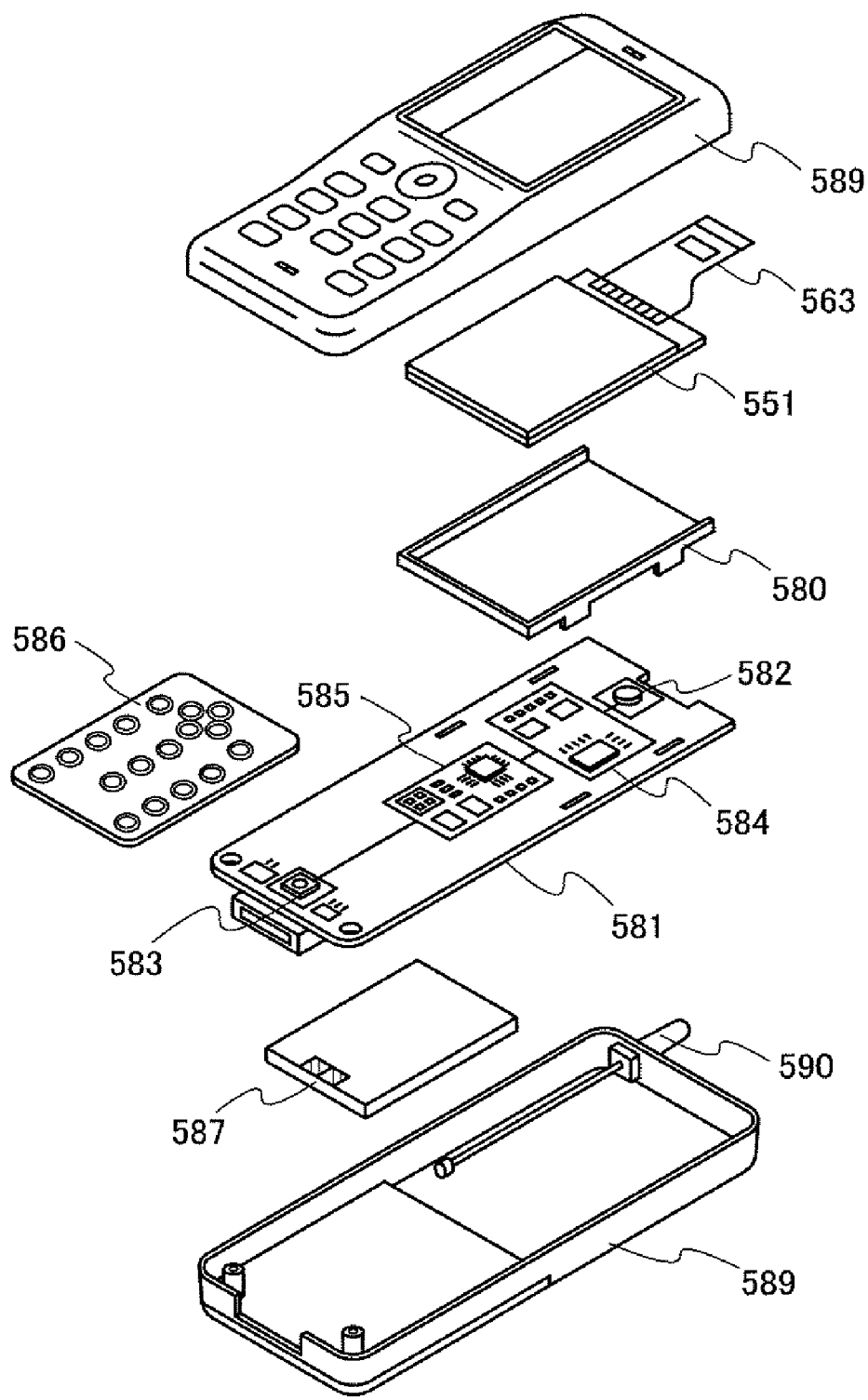
FIG. 18 illustrates an example of an electronic device.

FIG. 18 illustrates one mode of a mobile phone including the module illustrated in FIGS. 17A and 17B. The liquid crystal display panel 551 is detachably incorporated in a housing 580. The shape and the size of the housing 580 can be changed as appropriate in accordance with the size of the liquid crystal display panel 551. The housing 580 to which the liquid crystal display panel 551 is fixed is fitted in a printed wiring board 581 to be assembled as a module.

The liquid crystal display panel 551 is connected to the printed wiring board 581 through the FPC 563. The printed wiring board 581 is provided with a speaker 582, a microphone 583, a transmission/reception circuit 584, and a signal processing circuit 585 including a CPU, a controller, and the like. Such a module is combined with an input means 586, a battery 587, and an antenna 590 to be stored in a housing 589. A pixel portion of the liquid crystal display panel 551 is arranged so as to be seen from an opening window formed in the housing 589.

The mobile phone according to this embodiment mode can be changed into various modes depending on functions and applications thereof. For example, when a mobile phone is provided with a plurality of display panels or when a housing is divided into a plurality of portions as appropriate and can be opened and closed with a hinge, the above effect can be obtained.

By applying the invention disclosed in this specification to the mobile phone illustrated in FIGS. 17A and 17B and FIG. 18, a mobile phone including a display device with high response speed can be obtained.

Figure 19A:
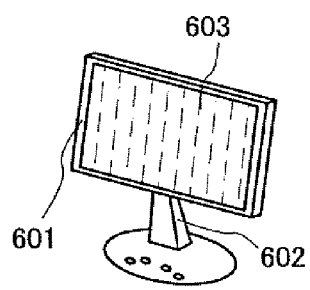
FIGS. 19A to 19E illustrate examples of electronic devices.

FIG. 19A illustrates a liquid crystal display including a housing 601, a support base 602, a display portion 603, and the like. The invention disclosed in this specification can be applied to the display portion 603.

By using the invention disclosed in this specification, a liquid crystal display including a display device with high response speed can be obtained.

Figure 19B:
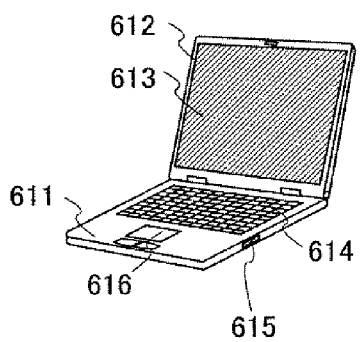

FIG. 19B illustrates a computer including a main body 611, a housing 612, a display portion 613, a keyboard 614, an external connection port 615, a pointing device 616, and the like. The invention disclosed in this specification can be applied to the display portion 613.

By using the invention disclosed in this specification, a computer including a display device with high response speed can be obtained.

Figure 19C:
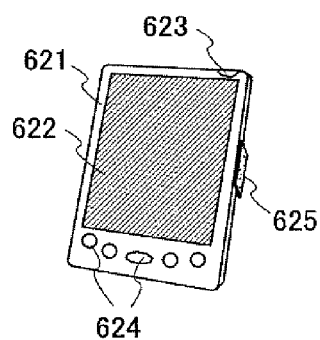

FIG. 19C illustrates a portable computer including a main body 621, a display portion 622, a switch 623, operation keys 624, an infrared port 625, and the like. The invention disclosed in this specification can be applied to the display portion 622.

By using the invention disclosed in this specification, a computer including a display device with high response speed can be obtained.

Figure 19D:
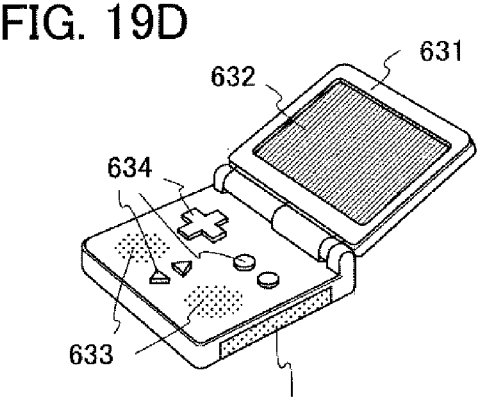

FIG. 19D illustrates a portable game machine including a housing 631, a display portion 632, speaker portions 633, operation keys 634, a recording medium insert portion 635, and the like. The invention disclosed in this specification can be applied to the display portion 632.

By using the invention disclosed in this specification, a game machine including a display device with high response speed can be obtained.

Figure 19E:
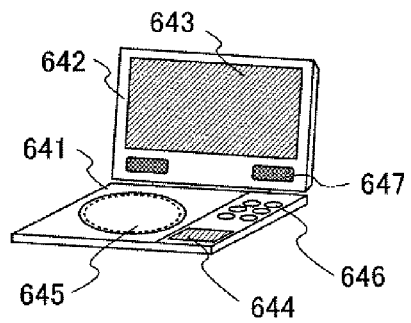

FIG. 19E illustrates a portable image reproducing device provided with a storage medium (specifically, a DVD player), which includes a main body 641, a housing 642, a display portion A 643, a display portion B 644, a storage medium reading portion 645, operation keys 646, speaker portions 647, and the like. The display portion A 643 mainly displays image data, and the display portion B 644 mainly displays text data. The invention disclosed in this specification can be applied to the display portion A 643, the display portion B 644, a control circuit portion, and the like. Note that a recording medium refers to a DVD or the like, and an image reproducing device provided with a recording medium includes a home game machine in its category.

By using the invention disclosed in this specification, an image reproducing device including a display device with high response speed can be obtained.

Figure 20A:
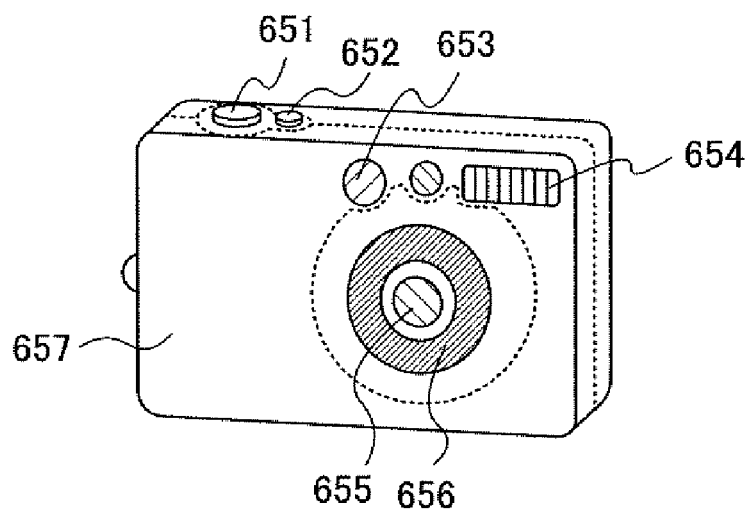
FIGS. 20A and 20B illustrate an example of an electronic device.
Figure 20B:
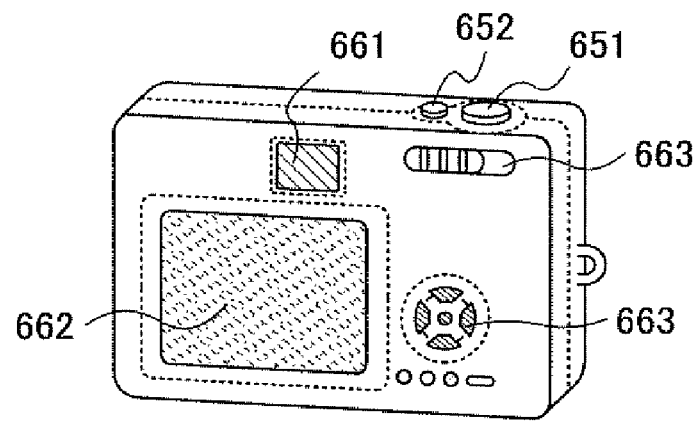

FIGS. 20A and 20B illustrate an example in which a liquid crystal display device of the invention disclosed in this specification is incorporated in a camera, for example, a digital camera. FIG. 20A is a front perspective view of the digital camera, and FIG. 20B is a rear perspective view of the digital camera. In FIG. 20A, the digital camera includes a release button 651, a main switch 652, a viewfinder 653, a flash portion 654, a lens 655, a lens barrel 656, and a housing 657.

Moreover, in FIG. 20B, the digital camera is provided with a viewfinder eyepiece 661, a monitor 662, and operation buttons 663.

When the release button 651 is pressed down halfway, a focusing mechanism and an exposure mechanism are operated. When the release button 651 is fully pressed down, a shutter is opened.

By pressing down or rotating the main switch 652, the digital camera is switched on or off.

The viewfinder 653 is provided above the lens 655 on the front side of the digital camera and is a device for checking an area to be photographed or the focus point from the viewfinder eyepiece 661 illustrated in FIG. 20B.

The flash portion 654 is located in an upper portion on the front side of the digital camera. When the luminance of an object to be photographed is not enough, the release button 651 is pressed down to open the shutter and deliver auxiliary light from the flash portion 654 at the same time.

The lens 655 is located at the front of the digital camera and includes a focusing lens, a zoom lens, and the like. The lens forms a photographic optical system with a shutter and a diaphragm which are not shown. Further, an imaging device such as a charge coupled device (CCD) is provided behind the lens.

The lens barrel 656 moves the position of the lens to adjust the focus of the focusing lens, the zoom lens, and the like. When a picture is taken, the lens barrel is slid out so that the lens 655 moves forward. Moreover, when the digital camera is carried, the lens 655 is lowered into the body to be compact. Note that in this embodiment mode, the digital camera can zoom in on an object to be photographed by sliding out the lens barrel; however, the invention disclosed in this specification is not limited to this structure. Alternatively, a digital camera can zoom in on an object to be photographed without sliding out the lens barrel because of the structure of the photographic optical system in the housing 657.

The viewfinder eyepiece 661 is located in the upper portion on the rear side of the digital camera and provided for looking therethrough in checking an area to be photographed and the focus point.

The operation buttons 663 are buttons having a variety of functions, which are provided on the rear side of the digital camera, and include a setup button, a menu button, a display button, a functional button, a selection button, and the like.

The liquid crystal display device of the invention disclosed in this specification can be incorporated in a monitor 662 of the camera illustrated in FIGS. 20A and 20B. Accordingly, a digital camera including a display device with high response speed can be obtained.

Note that examples shown in this embodiment mode are only examples; therefore, the invention disclosed in this specification is not limited to the above applications.

This application is based on Japanese Patent Application serial No. 2008-26560 filed with Japan Patent Office on Feb. 6, 2008, the entire contents of which are hereby incorporated by reference.

What is claimed is:

1. A liquid crystal display device comprising:
a liquid crystal material between a substrate and a counter substrate;
a plurality of pixels over the substrate; and
a microstructure over the substrate, the microstructure being in contact with the liquid crystal material, wherein the microstructure includes a movable portion.

2. The liquid crystal display device according to claim 1, wherein the microstructure includes a lower electrode, an upper electrode, and a space between the lower electrode and the upper electrode.

3. The liquid crystal display device according to claim 2, wherein the microstructure further includes a structural layer comprising an insulating film over the upper electrode.

4. The liquid crystal display device according to claim 1, wherein the microstructure is provided in each of the plurality of pixels.

5. The liquid crystal display device according to claim 1, wherein a thin film transistor is provided in each of the plurality of pixels.

6. A liquid crystal display device comprising:
a liquid crystal material between a substrate and a counter substrate; and
a microstructure over the substrate, the microstructure being in contact with the liquid crystal material, wherein the microstructure includes a movable portion.

7. The liquid crystal display device according to claim 6, wherein the microstructure comprises a lower electrode, an upper electrode, and a space between the lower electrode and the upper electrode.

8. The liquid crystal display device according to claim 7, wherein the microstructure further comprises a structural layer comprising an insulating film over the upper electrode.

9. The liquid crystal display device according to claim 6, wherein the microstructure is provided in each of a plurality of pixels over the substrate.

10. The liquid crystal display device according to claim 9, wherein each of the plurality of pixel has a thin film transistor.

11. A liquid crystal display device comprising:
a liquid crystal material between a substrate having an electrode and a counter substrate having a counter electrode; and
a microstructure over the substrate, the microstructure being in contact with the liquid crystal material, wherein the microstructure includes a movable portion.

12. The liquid crystal display device according to claim 11, wherein the microstructure comprises a lower electrode, an upper electrode, and a space between the lower electrode and the upper electrode.

13. The liquid crystal display device according to claim 12, wherein the microstructure further comprises a structural layer comprising an insulating film over the upper electrode.

14. The liquid crystal display device according to claim 11, wherein the electrode and the lower electrode are formed of a same material.

15. The liquid crystal display device according to claim 11, wherein the microstructure is provided in each of a plurality of pixels over the substrate.

16. The liquid crystal display device according to claim 15, wherein each of the plurality of pixel has a thin film transistor.

17. The liquid crystal display device according to claim 11, wherein the electrode is a pixel electrode.

18. The liquid crystal display device according to claim 11, further comprising:
an alignment film covering the counter electrode and the counter substrate.

* * * * *